United States Patent
Mathew et al.

(10) Patent No.: US 11,775,346 B2
(45) Date of Patent: Oct. 3, 2023

(54) CLOUD MANAGEMENT SYSTEM WITH AUTONOMOUS ABERRANT BEHAVIOR DETECTION

(71) Applicant: Sedai Inc., Pleasanton, CA (US)

(72) Inventors: Suresh Mathew, San Ramon, CA (US); Nikhil Gopinath Kurup, Tampa, FL (US); Hari Chandrasekhar, Highlands Ranch, CO (US); Benjamin Thomas, San Jose, CA (US); Vaibhav Desai, Fremont, CA (US)

(73) Assignee: Sedai Inc., Pleasanton, CA (US)

( * ) Notice: Subject to any disclaimer, the term of this patent is extended or adjusted under 35 U.S.C. 154(b) by 0 days.

(21) Appl. No.: 17/584,838

(22) Filed: Jan. 26, 2022

(65) Prior Publication Data

US 2022/0413956 A1 Dec. 29, 2022

Related U.S. Application Data

(60) Provisional application No. 63/214,784, filed on Jun. 25, 2021, provisional application No. 63/214,783, filed on Jun. 25, 2021.

(51) Int. Cl.
*G06F 11/07* (2006.01)
*G06F 9/50* (2006.01)
(Continued)

(52) U.S. Cl.
CPC ............. *G06F 9/5016* (2013.01); *G06F 8/71* (2013.01); *G06F 9/5094* (2013.01); *G06F 11/079* (2013.01); *G06F 11/0721* (2013.01); *G06F 11/0769* (2013.01); *G06F 11/3006* (2013.01); *G06F 11/34* (2013.01);
(Continued)

(58) Field of Classification Search
CPC .. G06F 11/0793; G06F 11/0709; G06F 11/34; G06F 11/3409; G06F 11/3452; G06F 11/3447; G06F 11/302
See application file for complete search history.

(56) References Cited

U.S. PATENT DOCUMENTS 8,868,474 B2 10/2014 Leung et al.
9,356,883 B1 5/2016 Borthakur
(Continued)

*Primary Examiner* — Yolanda L Wilson
(74) *Attorney, Agent, or Firm* — Yantra Patents LLC; Anand P Narayan

(57) ABSTRACT

Implementations described herein relate to methods, systems, and computer-readable media to identify anomalous applications. In some implementations, the methods may include obtaining application metric data that includes application level metrics and instance level metrics for each instance of a plurality of instances associated with a respective application of a plurality of applications operating over a distributed computing system, generating a first anomaly detection score based on the instance level metrics; generating a second anomaly detection score based on one or more input metrics associated with the respective application, generating a third anomaly detection score based on seasonal metric data associated with the respective application and identifying at least one application of the plurality of applications as an anomalous application based on the first anomaly detection score, the second anomaly detection score, and the third anomaly detection score.

17 Claims, 16 Drawing Sheets

(51) Int. Cl.
  *G06N 3/08*   (2023.01)
  *G06F 8/71*   (2018.01)
  *G08B 21/18*  (2006.01)
  *H04L 43/16*  (2022.01)
  *H04L 67/10*  (2022.01)
  *H04L 67/00*  (2022.01)
  *G06F 11/30*  (2006.01)
  *G06F 11/34*  (2006.01)

(52) U.S. Cl.
  CPC ........... *G06F 11/3452* (2013.01); *G06N 3/08* (2013.01); *G08B 21/182* (2013.01); *H04L 43/16* (2013.01); *H04L 67/10* (2013.01); *H04L 67/34* (2013.01); *G06F 2209/501* (2013.01)

(56) References Cited

U.S. PATENT DOCUMENTS

| | | |
|---|---|---|
| 10,270,788 B2 | 4/2019 | Faigon et al. |
| 10,355,950 B2 | 7/2019 | Tseitlin et al. |
| 10,374,919 B2 | 8/2019 | Pai et al. |
| 10,375,098 B2 | 8/2019 | Oliner et al. |
| 10,411,973 B2 | 9/2019 | Brown et al. |
| 10,432,722 B2 | 10/2019 | Jain et al. |
| 10,587,633 B2 | 2/2020 | Muddu et al. |
| 10,581,637 B2 | 3/2020 | Mathew et al. |
| 10,656,929 B2 | 5/2020 | Jamjoom et al. |
| 10,798,161 B2 | 10/2020 | Mathew et al. |
| 2016/0147583 A1* | 5/2016 | Ben Simhon ......... G06F 11/076 714/47.3 |
| 2019/0068627 A1 | 1/2019 | Thampy |
| 2019/0114245 A1* | 4/2019 | Mermoud ........... G06F 11/3466 |
| 2019/0163546 A1* | 5/2019 | Ungar .................... G06F 11/079 |
| 2019/0250970 A1* | 8/2019 | Gupta ................. G06F 11/0709 |
| 2019/0391805 A1 | 12/2019 | Benedetti et al. |
| 2020/0233774 A1* | 7/2020 | Toledano ............... G06F 16/288 |
| 2020/0267162 A1 | 8/2020 | Koottayi et al. |
| 2020/0341832 A1* | 10/2020 | Poghosyan ......... G06F 11/0751 |
| 2020/0356355 A1 | 11/2020 | Mathew et al. |
| 2021/0096915 A1 | 4/2021 | Patel et al. |
| 2021/0157702 A1* | 5/2021 | Lemberg ............... G06F 11/321 |
| 2022/0019935 A1* | 1/2022 | Ghatage ............. G06F 11/3072 |
| 2022/0108335 A1* | 4/2022 | Kaveetil ............ G06Q 30/0202 |

\* cited by examiner

CLOUD MANAGEMENT SYSTEM WITH AUTONOMOUS ABERRANT BEHAVIOR DETECTION

CROSS-REFERENCE TO RELATED APPLICATIONS

This application claims priority to U.S. Provisional Patent Application No. 63/214,783, filed 25 Jun. 2021, titled "AUTONOMOUS MANAGEMENT OF COMPUTING SYSTEMS" and to U.S. Provisional Patent Application No. 63/214,784, filed 25 Jun. 2021, titled "CLOUD MANAGEMENT SYSTEM WITH AUTONOMOUS ABERRANT BEHAVIOR DETECTION" both of which are incorporated by reference herein in their entirety.

TECHNICAL FIELD

Embodiments relate generally to autonomous outlier detection and detection of aberrant behavior in distributed computing systems.

BACKGROUND

Some computer systems utilize distributed architectures, e.g., cloud-based systems to host applications. The applications may be hosted across multiple computer systems that are operated by different service providers, and in many cases, using a variety of computing devices. There is a need for monitoring of the systems and detection of anomalies and/or aberrant behavior to ensure availability, efficiency, and compliance for cloud management on public, private, hybrid or multi-cloud platforms.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method. The computer-implemented method also includes obtaining application metric data that includes application level metrics and instance level metrics for each instance of a plurality of instances associated with a respective application of a plurality of applications operating over a distributed computing system; generating a first anomaly detection score based on the instance level metrics; generating a second anomaly detection score based on one or more input metrics associated with the respective application; generating a third anomaly detection score based on seasonal metric data associated with the respective application; and identifying at least one application of the plurality of applications as an anomalous application based on the first anomaly detection score, the second anomaly detection score, and the third anomaly detection score. Other embodiments of this aspect include corresponding computer systems, apparatus, and computer programs recorded on one or more computer storage devices, each configured to perform the actions of the methods.

Implementations may include one or more of the following features. The computer-implemented method may include determining a severity score associated with the anomalous application. Generating the first anomaly detection score may include: grouping the plurality of instances into a plurality of clusters; determining one or more dominant clusters based on a number of instances included in the plurality of clusters; and identifying one or more lonely clusters that lie outside a range bounded by the one or more dominant clusters. The computer-implemented method may include determining a number of clusters in the plurality of clusters based on recursively calculating a respective silhouette score for each instance in the plurality of clusters. The computer-implemented method may include determining a number of clusters in the plurality of clusters based on a determination of the number of clusters in the plurality of clusters that yields a maximum aggregate silhouette score for all instances in the plurality of clusters. Generating the second anomaly detection score may include: obtaining ground truth data for one or more application level metrics for the respective application; determining, using a trained machine learning model, a predicted value for the one or more application level metrics for the respective application based on the one or more input metrics; and calculating the second anomaly detection score based on a comparison of the predicted value for the one or more application level metrics with the ground truth data. Generating the third anomaly detection score may include: obtaining the seasonal metric data for the respective application; obtaining ground truth data for the respective application; determining, using a trained machine learning model, a predicted metric value for the respective application based on the seasonal metric data; and calculating the third anomaly detection score based on a comparison of the predicted metric value with the ground truth data. The computer-implemented method may include performing a remediation action for the anomalous application. Performing the remediation action may include: obtaining a current resource snapshot for the anomalous application; determining a post-remediation action resource level for the anomalous application based on performing the remediation action; and performing the remediation action for the anomalous application based on a determination that the post-remediation action resource level for the anomalous application meets a predetermined resource threshold. The remediation action may include deactivating one or more instances associated with the anomalous application. Implementations of the described techniques may include hardware, a method or process, or computer software on a computer-accessible medium.

One general aspect includes a non-transitory computer-readable medium. The non-transitory computer-readable medium also includes obtaining application metric data that includes application level metrics and instance level metrics for each instance of a plurality of instances associated with a respective application of a plurality of applications operating over a distributed computing system; generating a first anomaly detection score based on the instance level metrics; generating a second anomaly detection score based on one or more input metrics associated with the respective application; generating a third anomaly detection score based on seasonal metric data associated with the respective application; generating a combined score based on the first anomaly detection score, the second anomaly detection score, and the third anomaly detection score; and identifying at least one application of the plurality of applications as an anomalous application based on the combined score. Other embodiments of this aspect include corresponding computer systems, apparatus, and computer programs recorded on one or more computer storage devices, each configured to perform the actions of the methods.

Implementations may include one or more of the following features. Generating the first anomaly detection score may include: grouping the plurality of instances into a plurality of clusters; determining one or more dominant clusters based on a number of instances included in the plurality of clusters; and identifying one or more lonely clusters that lie outside a range bounded by the one or more dominant clusters. Generating the second anomaly detection score may include: obtaining ground truth data for one or more application level metrics for the respective application; determining, using a trained machine learning model, a predicted value for the one or more application level metrics for the respective application based on the one or more input metrics; and calculating the second anomaly detection score based on a comparison of the predicted value for the one or more application level metrics with the ground truth data. The operations further may include performing a remediation action for the anomalous application. The remediation action may include deactivating one or more instances associated with the anomalous application. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: obtaining application metric data that includes application level metrics and instance level metrics for each instance of a plurality of instances associated with a respective application of a plurality of applications operating over a distributed computing system; generating a first anomaly detection score based on the instance level metrics; generating a second anomaly detection score based on one or more input metrics associated with the respective application; generating a third anomaly detection score based on seasonal metric data associated with the respective application; generating a combined score based on the first anomaly detection score, the second anomaly detection score, and the third anomaly detection score. The system also includes identifying at least one application of the plurality of applications as an anomalous application based on the combined score. Other embodiments of this aspect include corresponding computer systems, apparatus, and computer programs recorded on one or more computer storage devices, each configured to perform the actions of the methods.

Implementations may include one or more of the following features. Generating the first anomaly detection score may include: grouping the plurality of instances into a plurality of clusters; determining one or more dominant clusters based on a number of instances included in the plurality of clusters; and identifying one or more lonely clusters that lie outside a range bounded by the one or more dominant clusters. The operations further may include determining a severity score associated with the anomalous application. The operations further may include performing a remediation action for the anomalous application. Performing the remediation action may include: obtaining a current resource snapshot for the anomalous application; determining a post-remediation action resource level for the anomalous application based on performing the remediation action; and performing the remediation action for the anomalous application based on a determination that the post-remediation action resource level for the anomalous application meets a predetermined resource threshold. Implementations of the described techniques may include hardware, a method or process, or computer software on a computer-accessible medium.

DETAILED DESCRIPTION

Figure 1:
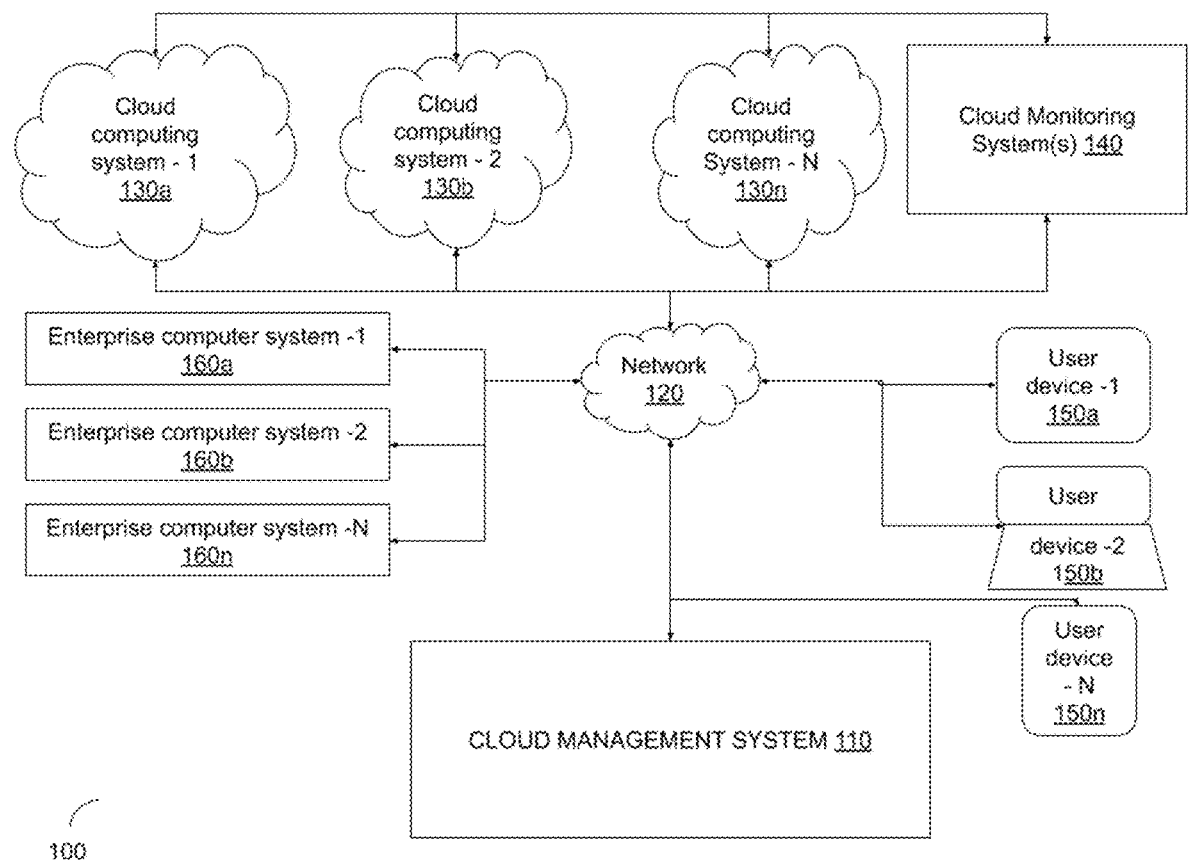
FIG. 1 is a diagram of an example distributed computing environment, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

Today's extremely competitive global market calls for a high degree of business agility and responsiveness to customer needs and tastes. The introduction rate of new features via software releases has steadily increased to meet ever-evolving customer needs, and innovative computing architectures such as cloud native microservice architectures are becoming the new norm. Releases have risen to hundreds per month with a consequent impact on the roles and responsibilities of Site Reliability Engineers (SRE) who are tasked with managing the computing environment.

Technical outages to computing systems can have significant business implications. For example, Costco warehouse, with over 98.6 million members, had one of its biggest outages on Thanksgiving Day in 2019, impacting close to 2.6 million of its customers and causing more than $11 million in losses. On the same day, Home Depot, H&M, and Nordstrom customers too reported issues with their e-commerce sites. According to the Information Technology Industry Council (ITIC), 86% of the companies estimate that an hour of downtime can cause a greater than $300,000 revenue loss, and for 34% of companies, anywhere from $1 to $5 million.

It was reported that for Black Friday shoppers specifically, nearly half of consumers (49%) say they will abandon their cart if they receive any error message during checkout that prevents them from completing their purchase. Shoppers who have to wait six seconds are 50% less likely to make a purchase, and 33% of shoppers will visit a competitor if the site they are currently on is slow to load.

For more critical services like health care, the stakes are much higher. Dexcom, a leader in continuous glucose monitoring systems, had a service outage for more than 24 hours, which resulted in irate customers and lives at risk.

With businesses increasingly earning larger revenue shares from online commerce, CTOs and SRE organizations are under tremendous pressure to achieve high levels of site availability at the most optimal costs—all while satisfying ever-increasing regulatory pressures.

In the pre-DevOps/Cloud era, monolithic services designed site architectures for product and software releases once or twice a year. However, businesses' modern needs now dictate faster responses to market signals. With the advent of cloud technology and simultaneous services segmentation, product features can be released quicker than ever—sometimes more than 50 times per year. But alongside an increased churn rate for features and versions comes elevated management costs.

Cloud adoption, virtualization, and DevOps maturity have led to agile deployment strategies and reduced time to market (TTM), which allows businesses to compete more effectively. Automation played a vital role on the road to achieving agile deployment—processes transitioned from being imperatively managed by a set of system administrators with command line interface, to being declaratively managed by a much smaller team of administrators in a distributed framework.

Organizations commonly utilize multiple cloud providers to implement their computing solutions. For example, an organization may utilize offerings from one or more providers, e.g., Amazon Web Services (AWS), Google Cloud Platform (GCP), Microsoft Azure etc., to implement their solution architecture. Metrics associated with their solution architecture and applications running over their architecture may be provided by multiple monitoring providers.

A typical software product implemented via a microservices based architecture may include hundreds of underlying applications. For example, a money transfer application may include multiple microservices operating using a combination of parallel and sequential processes, e.g., a client login microservice, a pre-validation check microservice, a microservice that performs funds availability verification, a risk analysis microservice to investigate fraud or other unauthorized transaction, etc.

Each microservice may be executed by a different code set, implemented, and managed by different teams, with their own development cycles, releases, etc. Each of the microservices may utilize its own metric or set of metrics to monitor performance and health of the microservice and/or application.

During run-time, issues and problems may occur at any of multiple levels, e.g., runtime errors or performance issues caused by code issues due to a new release, integration issues of a particular microservice with other microservices, integration issues with third party providers, network issues, hardware issues, etc.

This disclosure describes a cloud management platform to autonomously monitor distributed computer systems, detect abnormal system behavior and anomalies, and autonomously generate alerts and recommendations. In some implementations, autonomous remediation may be undertaken by the cloud management platform.

Unlike traditional remediation techniques and run book automation platforms that provide threshold-based automation, advanced machine learning techniques are utilized herein to detect issues with an application centric approach. The cloud management platform can integrate with various Cloud/PaaS providers and can auto detect (infer) an application topology with minimal user intervention. Integration with multiple monitoring providers is enabled and the metric data obtained can be overlaid on the inferred application topology. Application behavior is continually monitored and clustering techniques (e.g., self-correcting bounded clustering) may be utilized to identify misbehaving instances.

Another limitation commonly encountered with monitoring providers is collection delay. Monitoring providers commonly provide metric data that includes a data collection delay, e.g., a 15-20-minute data collection delay, which effectively leads to delayed detection of aberrant (abnormal) application behavior. For example, problems may be brought to notice of SREs after the collection delay. Per techniques of this disclosure, machine learning models are utilized to learn application behavior over time. The ML model(s) can predict a current (estimated) state of one or more applications and thereby compensate for missing data due to the collection delay.

Autonomous system characteristics in a cloud context are incorporated into the cloud management platform which utilizes an influx of data streams, e.g., time-series data of metrics, to build a layer of intelligence via a core decision engine that utilizes probability theory and applies machine learning techniques. The cloud management platform is self-learning and utilizes a self-correcting model to seamlessly manage cloud platforms with a focus on explainable decisions.

Abnormal (anomalous) behavior of applications may arise from specific anomalous instances, errors in the application codebase, network issues, etc. Per techniques of this disclosure, a trained ML model is utilized to analyze application-level problems and instance level problems and provide a recommendation based on identification of a problem source. The trained ML model is utilized to provide predictive detection and remediation of anomalous and/or aberrant behavior rather than reactive detection and remediation.

A two-tiered approach is utilized, whereby an alert engine generates signals and/or scores based on identification of instance-level and application-level outlets from the monitored metrics for each configured application being monitored. The generated signals and/or scores are then provided to a core decision engine, which utilizes additional historical data and feedback from previously provided recommendations and/or actions to provide recommendations for a current scenario. In some implementations, auto-remediation actions are also undertaken based on the provided recommendations, and particular implementation parameters.

FIG. 1 is a diagram of an example distributed computing environment, in accordance with some implementations. FIG. 1 illustrates an example system environment 100, in accordance with some implementations of the disclosure and illustrates a block diagram of an environment 100 wherein a cloud management service might be used. FIG. 1 and the other figures utilize similar (like) reference numerals to identify like elements. A letter after a reference numeral, such as "130," indicates that the text refers specifically to the element having that particular reference numeral. A reference numeral in the text without a following letter, such as "130," refers to any or all of the elements in the figures bearing that reference numeral (e.g., "130" in the text refers to reference numerals "130a," "130b," and/or "130n" in the figures).

The system environment 100 includes a cloud management system 110, which may include a variety of computer subsystems. Each of the subsystems can include a set of networked computers and devices. User system 110 can also include other subsystems not depicted, as they may pertain to the cloud management system.

The cloud management system is utilized to manage one or more distributed computing systems that are associated with one or more enterprise computer systems 160a, 160b, and 160n that utilize one or more cloud computing systems offered by respective infrastructure providers, 130a, 130b, and 130n that are connected via network 120.

Environment 100 may also include user devices 150a, 250b, and 150n that are utilized by users to access and/or execute one or more applications on the cloud computing systems. The cloud management system 110 itself may be implemented as a cloud-based system that is supplied and hosted by one or more third-party providers, and is accessible to users, e.g., system administrators and/or system reliability engineers (SREs), etc., via a variety of connected devices.

User devices 150 and enterprise computer system 160 may include any machine, system, or set of machines, systems that are used by an enterprise and users. For example, any of user devices 150 can include handheld computing devices, mobile devices, servers, cloud computing devices, laptop computers, workstations, and/or a network of computing devices. As illustrated in FIG. 1, user devices 150 might interact via a network 120 with a cloud computing system 130 that provides a service.

Cloud computing systems 130, cloud management system 110, and enterprise computer system 160 may utilize captive storage and/or cloud-based storage. In some implementations, on-demand database services may be utilized. The data store may include information from one or more tenants stored into tables of a common database image to form a multi-tenant database system (MTS). A database image may include multiple database objects. A relational database management system (RDMS) or the equivalent may execute storage and retrieval of information against the database object(s).

Access to cloud management system 110, enterprise computer systems 160, cloud monitoring system 140, and cloud computing system 130 may be controlled by permissions (permission levels) assigned to respective users. For example, when an employee or contractor associated with a cloud management system 110 is interacting with enterprise computer system 160, cloud monitoring system 140, user device(s) of the employee or contractor is provided access on the basis of permissions associated with that employee or contractor. However, an administrator associated with cloud management system 110 may be provided additional access privileges based on access privileges allotted to that administrator. In user systems with a hierarchical organization level, users at a certain permission level may have access to applications, data, and database information accessible to a lower permission level user, but may not be provided access to certain applications, database information, and data accessible to a user at a higher permission level. Thus, users can have different capabilities with regard to accessing and modifying application and database information, depending on a user's security or permission level.

Network 120 is any network or combination of networks of computing devices that enable devices to communicate with one another. For example, network 120 can be any one or any combination of a LAN (local area network), WAN (wide area network), telephone network, wireless network, point-to-point network, star network, token ring network, hub network, or other appropriate configuration.

The computer systems may be connected using TCP/IP and use other common Internet protocols to communicate, such as HTTP, FTP, AFS, WAP, etc. Users may access the systems by utilizing different platforms and frameworks, e.g., by using single-page client applications that use HTML and TypeScript.

An application execution environment as described herein can be any software environment that supports execution of a software application. For example, an application execution environment supported herein may be an operating system (e.g., Linux, Windows, Unix, etc.), a hypervisor that supports execution of one or more virtual machines (e.g., Xen®, Oracle VM Server, Microsoft Hyper-V™, VMWare® Workstation, VirtualBox®, etc.), a virtual computer defined by a specification, e.g., a Java Virtual Machine (JVM), an application execution container (e.g., containers based on Linux CGroups, Docker, Kubernetes, CoreOS, etc.), a process executing under an operating system (e.g., a UNIX process), etc. In some implementations, the application execution environment may be a software application, e.g., that is configured to execute on server hardware.

Techniques of this disclosure can be applied to a wide variety of deployment types, e.g., to distributed computing systems that utilize stateless containers, stateful containers, serverless deployments, etc.

Figure 2:
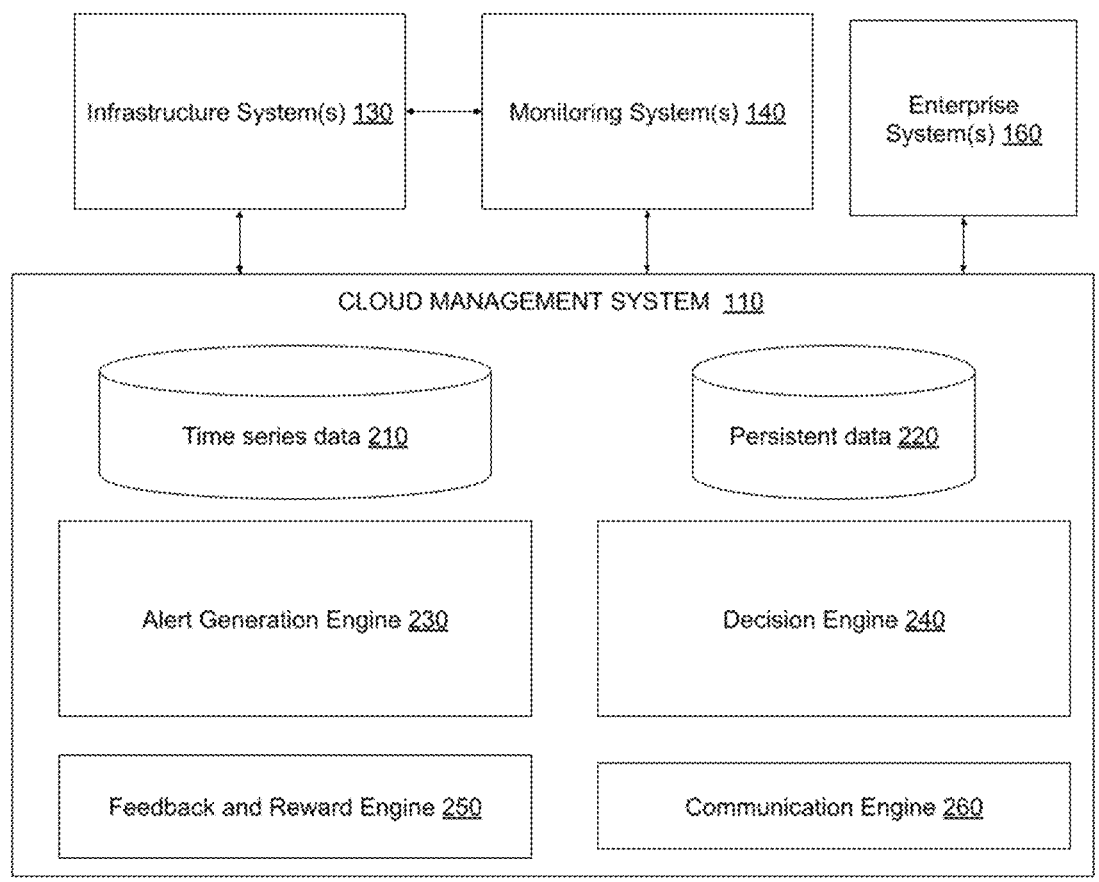
FIG. 2 illustrates a cloud management system, in accordance with some implementations.

FIG. 2 illustrates a cloud management system, in accordance with some implementations.

Cloud management system 110 may include subsystems configured for different functionality. In some implementations, cloud management system 110 may include an alert generation engine 230, a decision engine (core engine) 240, a feedback and reward engine 250, and a communication engine 260. Cloud management system 110 may also include one or more databases (datastores), for example, a time series database 210, and a persistent database 220.

In some implementations, databases 210 and 220 may be configured as external databases and/or cloud-based data storage that is accessible to the cloud management system. In some implementations, the cloud management system 110 is communicatively coupled to one or more infrastructure systems 130, monitoring system(s) 140, and enterprise system(s) 160.

In some implementations, the cloud management system is configured to receive monitoring metrics associated with applications implemented on and/or executing on one or more infrastructure systems (cloud computing systems). The monitoring metrics may be received directly from the infrastructure systems and/or monitoring system(s) associated with respective infrastructure systems.

Figure 3:
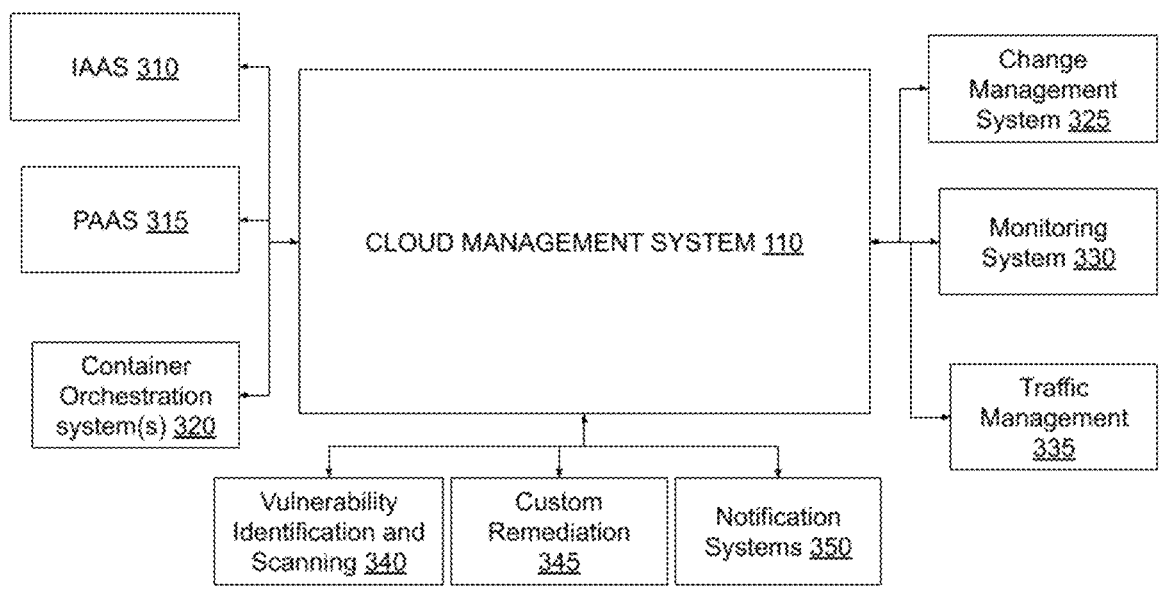
FIG. 3 is a diagram that depicts an example of a cloud management system and example interacting systems, in accordance with some implementations.

FIG. 3 is a diagram that depicts an example of a cloud management system and interacting computing systems, in accordance with some implementations.

As depicted in FIG. 3, the cloud management system is configured to interact with multiple systems for various purposes. For example, the cloud management system may be coupled to Infrastructure as a service (IAAS) systems 310 that enable an enterprise to lease or rent servers for compute and storage resources. The cloud management system may be coupled to IAAS systems located in different geographical locations.

In some implementations, the cloud management system may be coupled to Platform as a service (PAAS) systems 315 that enable enterprises to lease servers as well as receive access to other development and deployment resources, e.g., middleware, development tools, database management systems, business analytics services, etc.; to Container Orchestration systems 320 that enable automation of containerized workloads, e.g., Kubernetes, Docker Swarm, Apache Mesos, etc.

In some implementations, the cloud management system may be coupled to one or more Change Management System(s) 325 that enable enterprises to manage change and release processes and to meet their auditing and compliance requirements; to one or more monitoring systems 330; and to Traffic Management System(s) 335 that are utilized to manage cloud traffic at various layers.

In some implementations, the cloud management system may be coupled to a vulnerability identification and scanning system 340, e.g., which may operate upon alerts received from the cloud management system to detect security issues/flaws and or attacks.

In some implementations, the cloud management system may be coupled to a Custom Remediation System 345, operable to perform custom remediations based on detected anomalies.

One or more notification systems 350, e.g., Slack, pager systems, email systems, etc. may be coupled to the cloud management system for the transmission of alerts, messages, and notifications to users.

Figure 4A:
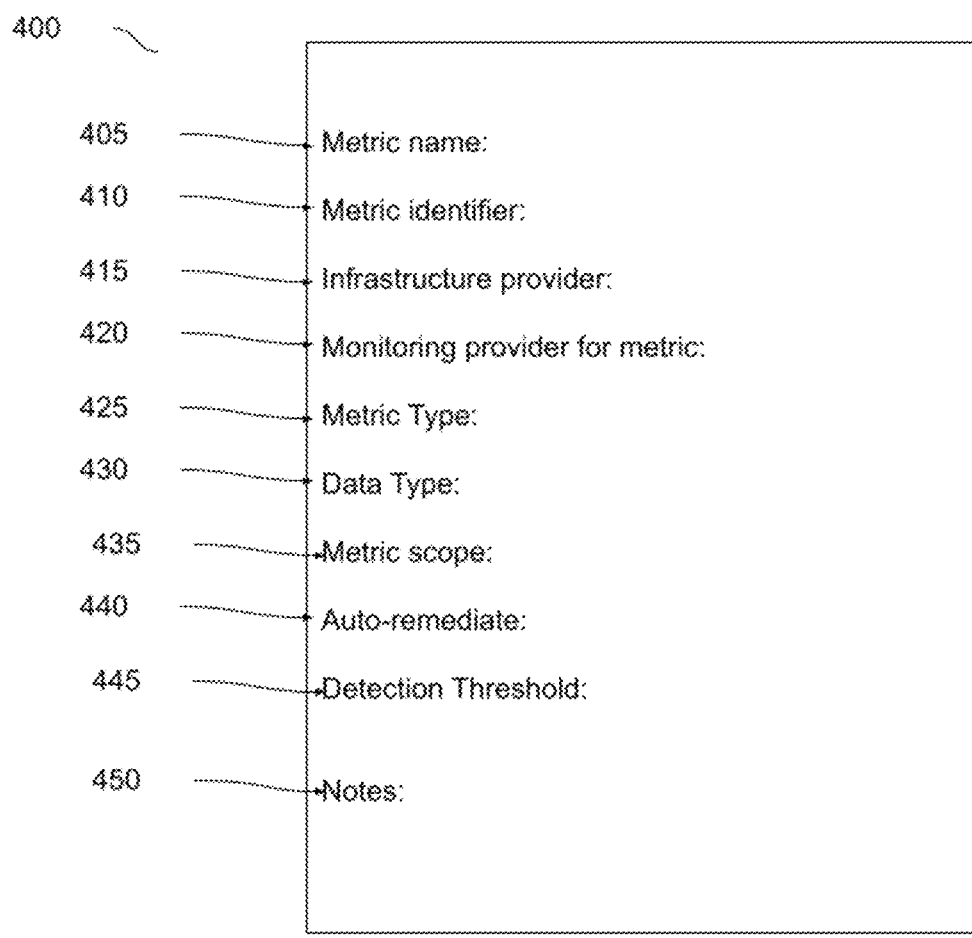
FIG. 4A depicts an example metric in a distributed (cloud) computing environment, in accordance with some implementations.

FIG. 4A depicts an example monitoring metric and associated attributes in a distributed (cloud) computing environment, in accordance with some implementations.

As described earlier, the cloud management system may receive and/or obtain one or more monitoring metrics from a cloud computing system and/or monitoring system associated with one or more applications that are being monitored and managed.

In some implementations, the monitoring metrics may be automatically received by the cloud management system. In some other implementations, the monitoring metrics may be obtained by querying a database, e.g., Prometheus, etc. at periodic intervals.

In this illustrative example, an example monitoring metric record is depicted, with associated attributes, metric name 405, a metric identifier 410, an originating infrastructure provider (cloud computing provider) identifier 415, a monitoring metric provider 420, a metric type 425, a data type 430 associated with the monitoring metric, metric scope 435, an auto remediate field 440 that indicates whether auto remediation should be performed based on the particular metric, a detection threshold 445 for any anomaly detection, and notes 450 associated with a metric.

The list of attributes for the example metric provided above is provided as an example, is not exhaustive, and specific implementations may utilize additional monitoring metrics for each application being managed/monitored, and some implementations may omit some of the attributes altogether.

Monitoring metrics and their attributes may be specified by a user, e.g., a user or administrator associated with an enterprise system, monitoring system, or cloud computing system provider, or be automatically inferred by the cloud management system.

A suitable user interface may be utilized to enable users to define/specify monitoring metrics and associated attributes. Menu options, e.g., pull-down menu options, etc., may be provided to enable easy user selection of monitoring metric(s) and associated attributes. For example, a metric type attribute for a monitoring metric may be specified to be one of a volume, saturation, latency, error, ticket; a data type for a monitoring metric may be specified to be one of a number, a percentage, or a counter; a metric scope for a monitoring metric may be specified to be one of site wide, application specific, load balancer, or instance.

In some implementations, the attributes may be specified by tags that are associated with the monitoring metric and provided by the cloud computing system or the monitoring system that is generating and providing the metrics.

Figure 4B:
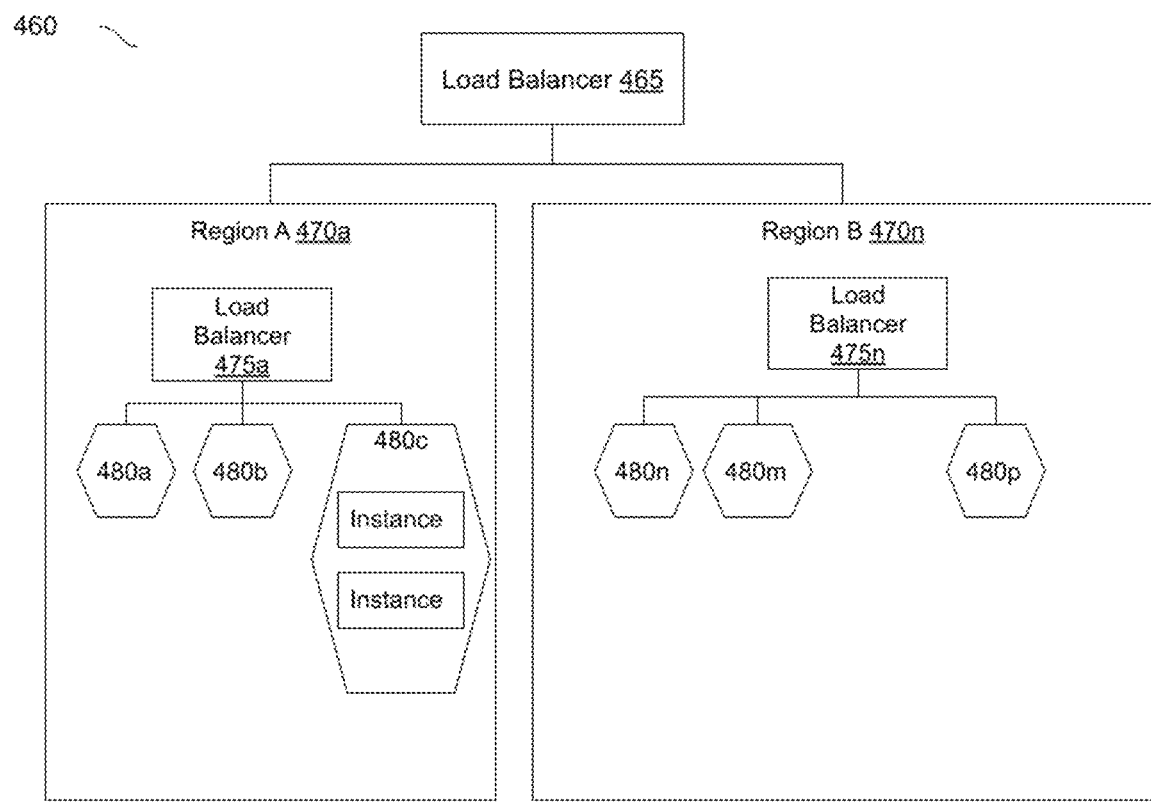
FIG. 4B depicts an example topology within a distributed (cloud) computing environment, in accordance with some implementations.

FIG. 4B depicts an example topology within a distributed (cloud) computing environment, in accordance with some implementations.

Distributed computing environments are commonly distributed over geographical regions to serve a diverse set of users, with dedicated computing resources earmarked for processing applications associated with a particular region. Within each region, one or more cloud computing systems may be utilized to serve and process applications. Load balancers at a global regional level are utilized to distribute the computing load evenly across available computing resources.

A first step undertaken by a cloud management platform is the discovery of a site (e.g., client site) and charting of its topology. Subsequently, a complete and holistic state of all applications and infrastructure is registered, which enables complete observability and permits the system to become self-aware. Application tags for each application may be utilized to infer a particular site's infrastructure as well as to create custom profiles.

In this illustrative example, an example topology 460 of the computing environment is depicted in FIG. 4B. A load balancer 465 at the global level is utilized to receive requests, e.g., http requests, etc., from users and distribute it to regional computing clusters 470a or 470n.

Within each region, a load balancer may be utilized to distribute computing tasks to available resources. For example, load balancer 475a may be utilized in region 470a, and load balancer 475n may be utilized in region B.

Based on the type of requests, the load balancers may distribute tasks to available virtual machines within the cluster. Specialized management tools and software may be available for the distribution of tasks to resources.

In some implementations, a virtual machine may be utilized for only one type of application, whereas in other implementations, a virtual machine may be utilized for multiple types of applications, and even multiple applications from multiple client users.

Specific infrastructure providers may utilize different techniques and tools to track assignment of computing tasks to resources. For example, in some implementations, a load balancer may maintain a list of currently executing tasks, and alternately, a history or log of tasks processed as well.

In some other implementations, e.g., containerized systems, a state of a cluster of compute resources may be represented as objects that describe what containerized applications are running on which nodes, resources allocated to those applications, and any associated policies.

Figure 5:
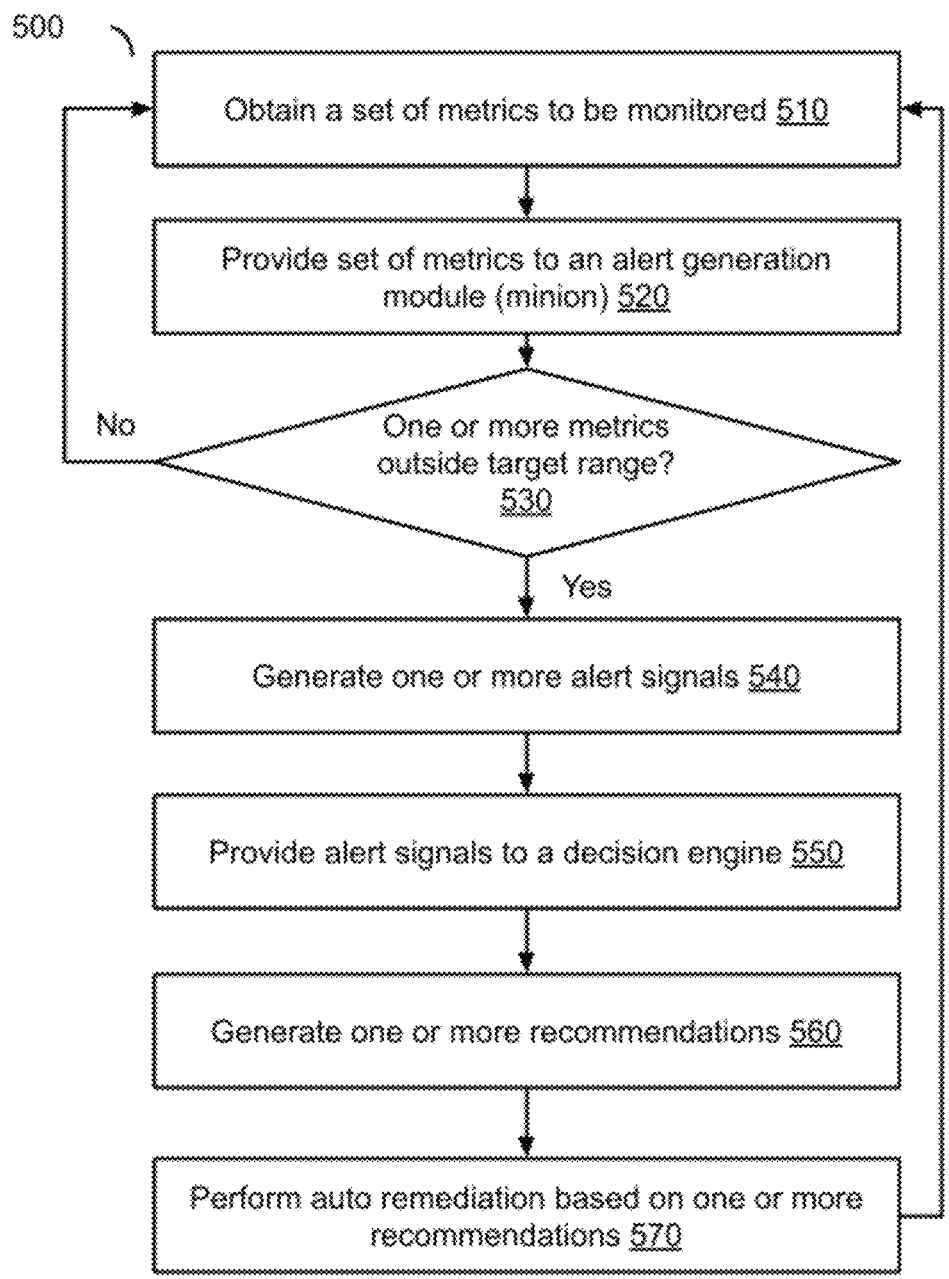
FIG. 5 is a flowchart illustrating an example method to generate an alert based on an anomalous application, in accordance with some implementations.

FIG. 5 is a flowchart illustrating an example method to generate an alert based on an anomalous application, in accordance with some implementations.

In some implementations, method 500 can be implemented, for example, by cloud management system 110 described with reference to FIG. 1. In some implementations, some or all of the method 500 can be implemented on one or more systems as shown in FIG. 1, on and/or on a combination of user systems and processing systems. In the described examples, the implementing system includes one or more digital processors or processing circuitry ("processors"), and one or more storage devices (e.g., storage device 210, 220, or other storage devices). In some implementations, different components of one or more servers and/or clients can perform different blocks or other parts of the method 500. In some examples, a first device is described as performing blocks of method 500. Some implementations can have one or more blocks of method 600 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., reception of a fresh batch of monitoring metrics, based upon a user request, at a predetermined time, a predetermined time period having expired since the last performance of method 500, and/or one or more other conditions occurring which can be specified in settings read by the method.

Processing may begin at block 510. At block 510, a set of metrics to be monitored is obtained.

Block 510 may be followed by block 520.

At block 520, the set of metrics and associated values are provided to an alert generation module.

Block 520 may be followed by block 530.

At block 530, it is determined if one or more metrics from the set of monitored metrics is outside a predetermined range.

In some implementations, the range may be specified via specification of one or more thresholds for each of the one or more metrics. In some other implementations, the range may be specified by specification of patterns for the one or more metrics.

If it is determined that one or more metrics from the set of monitored metrics lie outside a predetermined range, block 530 may be followed by block 540, else block 530 may be followed by block 510.

At block 540, one or more alert signals may be generated. In some implementations, the alert signals may additionally be indicative of a severity of a detected anomaly and may also include additional metadata associated with the anomaly.

Block 540 may be followed by block 550.

At block 550, the alert signal(s) may be provided to a decision engine (core).

Block 550 may be followed by block 560.

At block 560, one or more recommendations may be generated by the decision engine.

In some implementations, the one or more recommendations are made based on the received alert signals(s) and previous recommendations and actions undertaken by the cloud management platform. For example, recommendations and/or actions that successfully alleviated anomalies that were associated with certain alert signal(s) previously may be favored over recommendations and/or actions that did not succeed in alleviating anomalies previously. A feedback and reward engine, e.g., similar to feedback and reward engine 250 described with reference to FIG. 2 may be utilized to filter the recommendations.

In some implementations, the recommendation(s) and/or alerts may be transmitted to one or more distribution channels, e.g., to a dashboard for display, to a paging system, to an email system, etc. Selection of one or more channels may be based on a severity of the alert signal(s) and/or recommendations.

Block 560 may be followed by block 570.

At block 570, auto remediation may be performed based on the one or more recommendations and based on configuration settings that specify that auto remediation may be performed automatically by the cloud management system, e.g., specified by client, etc.

Auto remediation is performed based on recommended actions that can be automatically performed by the cloud management platform. For example, if the recommended remediation is the restarting of an instance, the cloud management system may utilize suitable credentials to automatically restart an anomalous instance.

In some implementations, a current resource availability may be determined before performing auto remediation to ensure that the system performance is not negatively affected. In some implementations, a current topology of affected resources may be obtained to ensure that the system state has not changed significantly from the time that the recommendation was generated, and that the recommended action is still likely to be valid.

In some implementations, a method to auto remediate may include identifying a type of remediation task, obtaining a list of critical infrastructure metrics that may be impacted, verifying in real time the status of the list of critical infrastructure metrics, and based on a determination that the auto remediation is not likely affect the critical infrastructure metric, perform the auto remediation.

Autonomous remediation actions may include actions such as reboot an instance (virtual machine) or to reboot an application. Specific workflows are utilized to ensure that autonomous remediation actions do not further degrade system performance.

Remediation actions may be performed as a hierarchical sequence. For example, a reboot instance action may be performed before a replace instance action. Metrics and signals are monitored to determine the effect of any remedial actions that are performed. Repeated signals indicating continued anomalous behavior may serve as a sign that the performed actions did not rectify issues. A record is maintained of performed remedial actions.

Figure 6:
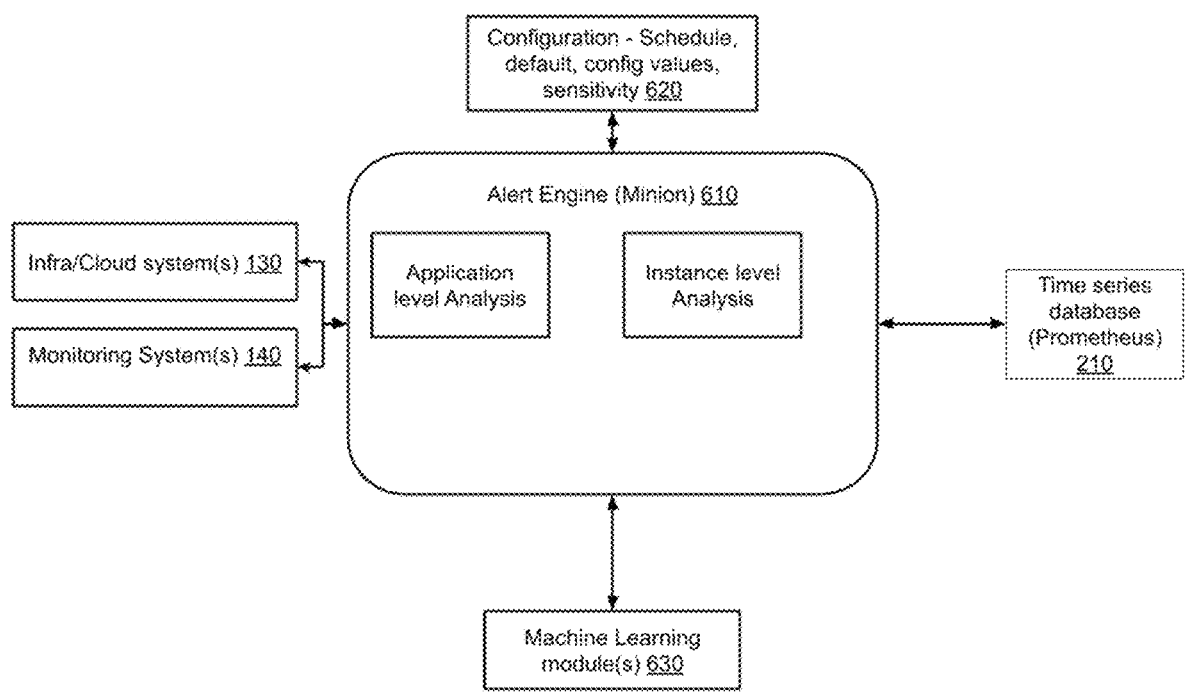
FIG. 6 is a block diagram that depicts an example implementation of an alert engine (minion) and interacting components, in accordance with some implementations.

FIG. 6 is a block diagram that depicts an example implementation of an alert engine (minion) and interacting components, in accordance with some implementations.

As depicted in FIG. 6, alert engine 610 is configured to receive inputs, e.g., metrics from infrastructure/cloud systems 130 and/or monitoring systems 140. The alert engine is also coupled to configuration module 620, which may store information about one or more applications to be monitored, metrics to be monitored, metadata associated with the metrics, client organization preferences and priorities, thresholds, sensitivity coefficients associated with various metrics and applications, etc.

The alert engine (minion) is coupled to time series databases 210, e.g., Prometheus, that may be utilized to obtain time-series data about various metrics associated with one or more applications. In some implementations, time-series data may be obtained with a predetermined delay, e.g., a 20-minute delay. In some implementations, the time-series data may be obtained with a dynamic lag (delay), and the delay may be specified during the data transfer or may be subsequently estimated based on time-stamp data, etc. In some implementations, an adjustment is made to extrapolate the lagged (delayed) time-series data in order to estimate a current value of time-series data based on previously received time-series data.

For example, an estimated current value based on just received (which may be delayed by a predetermined time, or may include delay that can be estimated based on time-stamps) and patterns of time-series determined based on a history of received time-series data, e.g., last 2 sets, last set, etc. In some, adjustments may be made to also include seasonality-based trends.

The alert engine 610 is also coupled to one or more machine learning module(s) 630 that are utilized for anomaly and outlier detection. The alert engine may be utilized to perform checks on various types of anomalies and may utilize multiple techniques for anomaly detection.

Figure 7A:
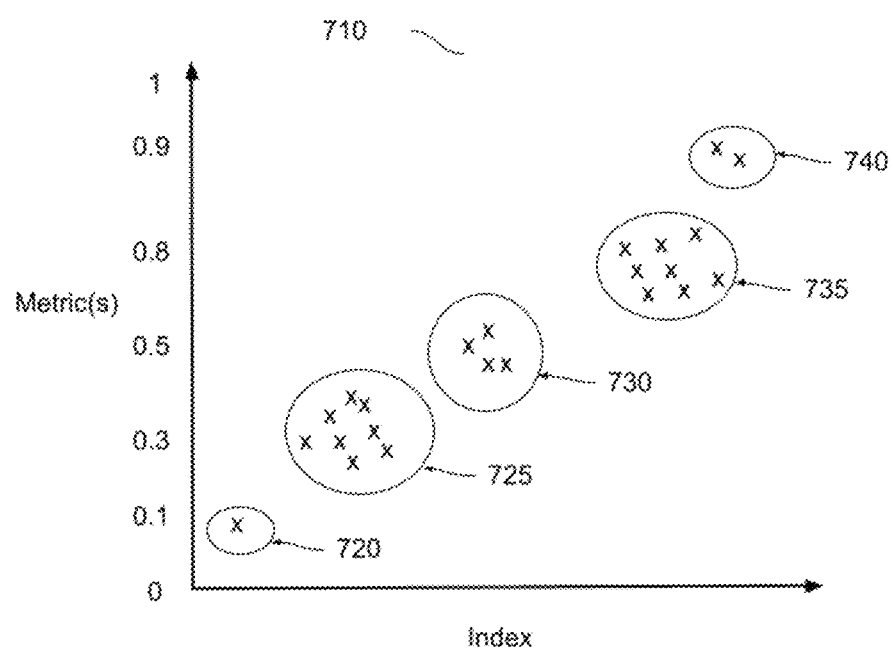
FIG. 7A depicts example detection of outlier detection, in accordance with some implementations.

FIG. 7A depicts example detection of outlier detection, in accordance with some implementations.

Outlier detection may be utilized to identify instances of applications that are associated with abnormal behavior that may be indicative of one or more problems. For example, if in a certain scenario, ten instances are serving an application, it is expected that they are substantially identical in behavior and are expected to have the same range in terms of metrics such as CPU, memory, etc. Anomaly detection (outlier detection) is utilized to determine if one or more instances associated with an application are behaving differently from their peer instances.

In some implementations, outlier detection is performed one metric at a time, for all monitored metrics across a set of monitored applications.

For a particular metric of an application, the corresponding metric value is obtained for all instances of the application. The metric values may be obtained, for example, by querying a suitable time-series database, as described earlier.

A recursive clustering process may be utilized to determine an optimal number of clusters. Clusters with a varying number of clusters are generated based on the metric values. A silhouette coefficient (score or value) is determined (calculated) for the clusters that is indicative of a tightness of the cluster. The silhouette coefficient for a set of clusters of a metric is a measure of how similar a metric value of an instance in the cluster is to metric values of other instances in the cluster compared to metric values of instances in other clusters. The silhouette coefficient can range from −1 to +1, wherein a high value for an instance indicates that the instance is well matched to other instances in its own cluster and poorly matched to instances in neighboring clusters. If most instances have a high value, then the clustering configuration is deemed suitable. If many instances have a low or negative value for a silhouette coefficient, then the clustering configuration may have too many or too few clusters.

In some implementations, a configuration with a number of clusters that yields the highest silhouette coefficient (e.g., maximum aggregate silhouette score) for instances is selected as an optimal configuration of clusters. In some implementations, the first configuration that meets a predetermined threshold of silhouette coefficient may be selected, and the plurality of instances are grouped into a plurality of clusters based on the first configuration. An analysis of the clusters thus formed is undertaken. In some implementations, historical values of the metric may be utilized to validate the instance values.

FIG. 7A depicts an illustrative example configuration of instances that have been grouped (clustered) into 5 clusters based on their metric values. As can be seen, there are two large clusters, cluster 725 and cluster 735 of instances, and relatively smaller clusters, cluster 720, cluster 730, and cluster 740.

Per techniques of this disclosure, clusters with a large number of instances, e. g., greater than a certain percentage/ratio of total instances, are deemed normal and/or dominant clusters. In some implementations, the metric values of clusters with a large number of instances may be compared to specified normal ranges as an additional check. In some implementations, a top N number of clusters, or a top M % of clusters may be deemed as dominant clusters and are utilized to establish a baseline value for the metric.

In some implementations, the clusters are rank ordered based on a number of instances in each cluster, and metric values (aggregate value, centroid value, etc.) are compared to metric values of dominant clusters.

Metric values of other clusters may be compared against metric values of one or more dominant cluster(s). For example, based on the comparison, clusters may be identified tiny clusters, transitional clusters, or lonely clusters.

In some implementations, clusters with a number of instances that meet a predetermined threshold (measured as a percentage/ratio of total number of instances) are deemed to be clusters with normally operating instances. In this illustrative example, cluster 725 and cluster 735 are considered to be clusters with normally operating instances. Clusters of instances where the instance values (average value of instances in cluster, centroid value for cluster, etc.) lie between values associated with normally operating instances are considered to be migratory (transitory) clusters, e.g., clusters of instances that are in the process of changing a state (of metric value) from one cluster to another. In this illustrative example, cluster 730 includes instances with metric values that lie between the metric values of instances in cluster 725 and cluster 735 and is therefore considered to be a migratory cluster. Instances that are located in migratory clusters are excluded from consideration as outlier instances.

Clusters that have a relatively small number of instances, e.g., clusters with a number below a predetermined threshold ratio (or percentage of total instances), and that are not migratory clusters are considered 'lonely' clusters are considered as candidate outlier clusters. In some implementations, one or more lonely clusters are identified that lie outside a range (of metric values) bounded by one or more dominant clusters. In this illustrative example, cluster 720 (with just a single instance) and cluster 740 (with two instances) are considered candidate outlier clusters, and the corresponding instances are considered candidate outlier instances. Such candidate outlier clusters may typically be located towards extremities of a range of metric values.

In some implementations, a cluster (metric and/or application) may be identified as a cluster with aberrant behavior and/or as an outlier or anomalous clusters based on a deviance of metric values of the cluster from one or more dominant clusters meeting a threshold. In some implementations, the threshold may be predetermined, or be based on statistical properties of the metric.

In some implementations, additional rules may be utilized to further filter candidate outlier clusters to determine outlier instances. For example, a cluster may be determined to be aberrant only if the deviance of metric values meets a threshold, and in some cases, an application or instance may not include any application/instance with anomalous behavior.

In some implementations, a first anomaly detection score may be determined based on the identified outlier instances and based on a relative distance of deviation of metric values from a value of a dominant cluster. In some implementations, the relative distance may be scaled to a value between 0 and 100 based on the relative distance.

Figure 7B:
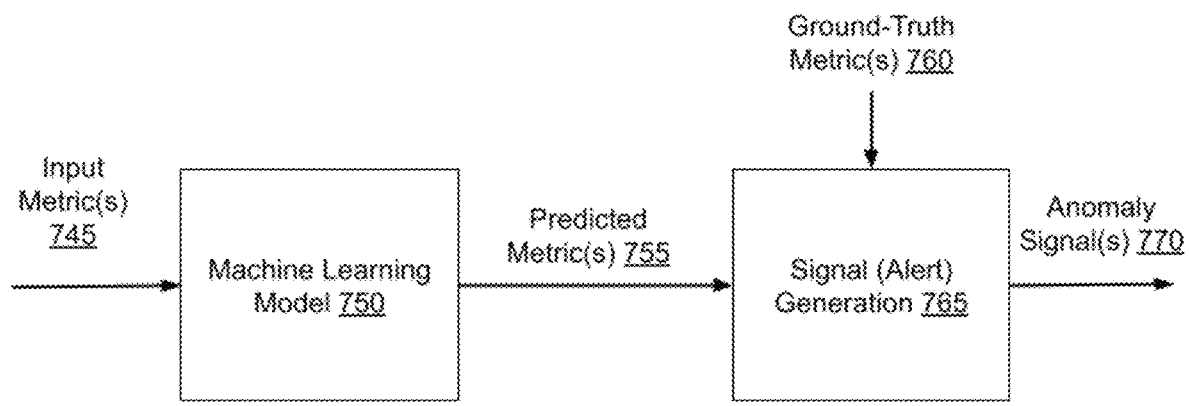
FIG. 7B is a block diagram that depicts determination of a load-based anomaly detection score, in accordance with some implementations.

FIG. 7B is a block diagram that depicts determination of a input-metric (load-based) anomaly detection score, in accordance with some implementations.

Load based outliers may be determined by verifying that application-level metrics for an application are commensurate with a load or traffic that is being handled by the application. For example, it may be determined whether a relatively high value for one or more metrics for an application, e.g., CPU utilization, is caused mainly due to high levels of traffic, e.g., during a long holiday for an application serving streaming content to users where expected usage is high, high shopping days such as Black Friday for an ecommerce application, etc.

For each application being monitored, corresponding input metrics are determined. This may vary from application to application, and may include metrics such as user traffic, incoming requests, etc. Input metrics may be auto-detected by the monitoring system (for example, bases on an analysis of a pattern of a particular metric) or may be specified by a user, monitoring system, etc., or may be auto detected by the cloud management system based on an analysis of time-series data for different metrics, and a determination of which particular metrics of a set of metrics are largely driven (influenced) by external factors.

For each application being monitored, input metric data 745 for one or more input metrics is provided to a trained machine learning (ML) model 750. As described earlier, a current value of the input metric(s) may be determined by adjusting for any time-delays in received time-series data of the input metric(s).

Based on the provided input metric(s), the ML model generates a predicted metric value 755 for one or more metrics for that application. In some implementations, a time-series prediction technique may be utilized by the ML model for estimating the metrics. The one or more metrics can include multiple metrics that are monitored for the application, and can include primary metrics, secondary metrics, value metrics, etc.

The predicted metric values for the one or more metrics are compared to actual metric values (ground-truth metrics) 760 at a signal (alert) generation module 765. Based on the comparison, one or more anomaly signal(s) 770 and/or severity scores are generated based on a deviation of the predicted and ground-truth metric values. Other meta-data may also be determined by the ML model and provided to the alert generation module.

In some implementations, signals are generated on a per metric basis for each application, and then combined to determine applicant level behavior, e.g., whether aberrant, normal, etc. In some implementations, all anomalous metrics for an application may be combined to generate and/or output a combined anomaly score.

Figure 7C:
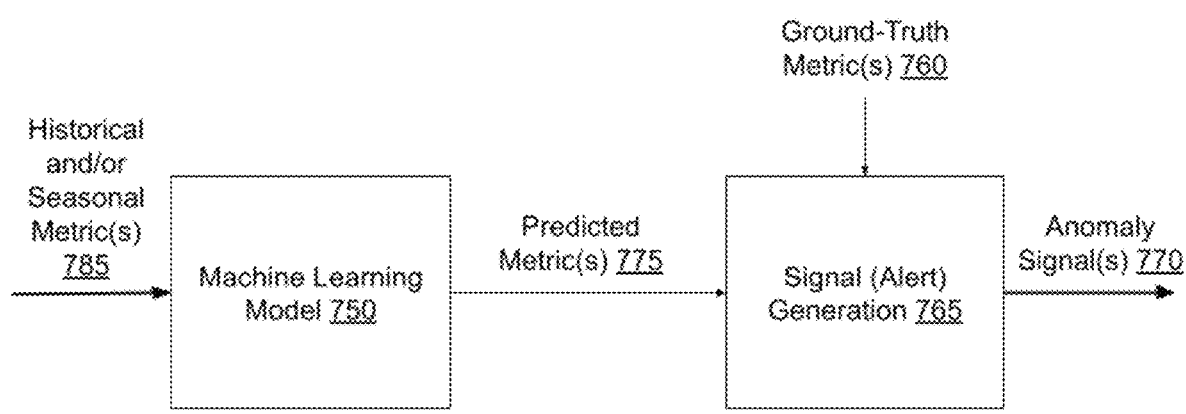
FIG. 7C is a block diagram that depicts determination of a seasonality-based anomaly detection score, in accordance with some implementations.

FIG. 7C is a block diagram that depicts determination of a seasonality based anomaly detection score, in accordance with some implementations.

Seasonality based anomaly detection score(s) and or outliers may be determined by verifying that application level metrics for an application are on expected lines based on historical and/or seasonal trends previously observed for the application. For example, it may be determined whether a relatively high value for one or more metrics for an application, e.g., Disk I/O is part of a previously observed increasing trend, or whether a relatively high value for one or metrics, while abnormal compared to the immediate past period, was routinely observed a few weeks previously, without any subsequent problems observed.

For each application being monitored, metric values for a plurality of time periods are obtained. In some implementations, for each metric, in addition to current time-series data for the metric, historical and/or seasonal data is obtained. In some implementations, seasonal data may include the last 2 days, last 7 days, and/or data for a corresponding day of the week for the past few weeks, etc. In some implementations, the seasonal data is obtained for substantially the same time as a time for which current time-series data is obtained. For example, if the current time-series data correspond to 2 pm on a Monday, the historical data may include time-series data for approximately 2 pm for the past 2 days, for approximately 2 pm for the past 7 days, data for approximately 2 pm for a previous number of Mondays, e.g., 12 Mondays, 24 Mondays, etc.

For each application being monitored, historical and/or seasonal metric data 785 for one or more metrics is provided to a trained machine learning (ML) model 750. The model is applied to obtain a predicted metric value for that metric.

Based on the provided historical and/or seasonal metric data, the ML model generates a predicted metric value 775 for one or more metrics for that application. In some implementations, a time-series prediction technique may be utilized by the ML model for estimating the metrics. The one or more metrics can include multiple metrics that are monitored for the application, and can include primary metrics, secondary metrics, value metrics, etc.

The predicted metric values for the one or more metrics are compared to actual metric values (ground-truth metrics) 760 at a signal (alert) generation module 765. Based on the comparison, one or more anomaly signal(s) 770 and/or severity scores are generated based on a deviation of the predicted and ground-truth metric values. Other meta-data may also be determined by the ML model and provided to the alert generation module.

In some implementations, the seasonality-based detection is load agnostic. In some implementations, a nonlinear model may be utilized to combine intermediate signals generated based on scores for different time periods of the historical and/or seasonal time periods. For example, a n-tuple may be determined for each metric, where each element of the n-tuple is assigned a value of high "H," or low "L," based on whether a ground truth value for the metric was higher or lower than the value for a previously observed n periods, e.g., previous 2 days, previous week, previous 12 Mondays, etc. For example, if the ground truth data is compared to metric values from three previous time-periods, a 3-tuple such as "LHL" or "HLH" may be generated based on the comparison of the ground truth metric values and historical values.

In some implementations, a voting method may be utilized based on the n-tuple to generate a seasonality-based anomaly detection score and/or a severity score. In some implementations, a look-up table may be utilized to generate a seasonality-based anomaly detection score and/or a severity score based on the n-tuple. In some implementations, a numerical method may be utilized to combine individual elements of the n-tuple.

In some implementations, a combinatorial approach may be utilized, and scores may be interpolated based on applied ML techniques.

Figure 8:
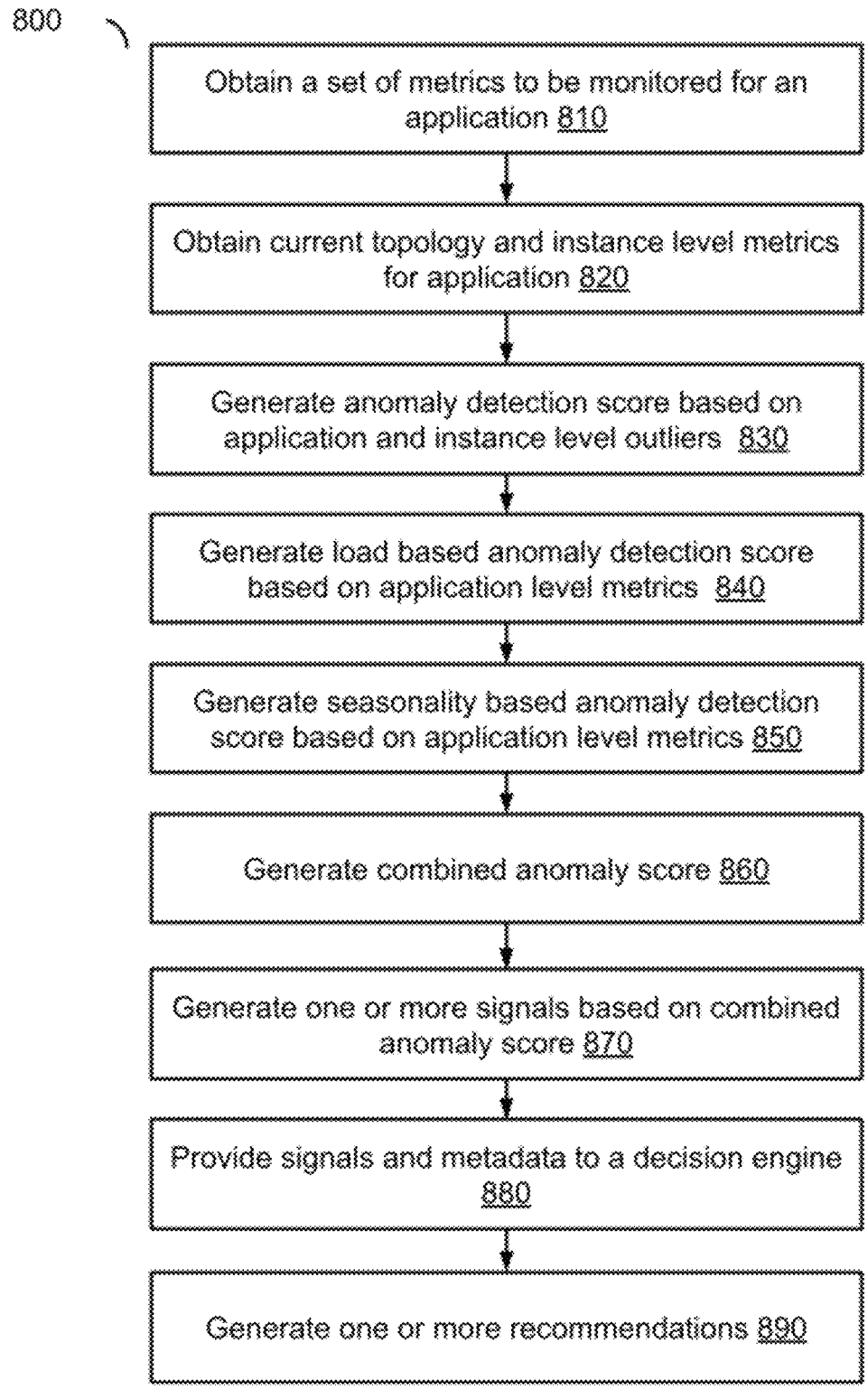
FIG. 8 is a flowchart illustrating an example method to detect an anomalous application, in accordance with some implementations.

FIG. 8 is a flowchart illustrating an example method to detect an anomalous application, in accordance with some implementations.

In some implementations, method 800 can be implemented, for example, by cloud management system 110 described with reference to FIG. 1. In some implementations, some or all of the method 800 can be implemented on one or more systems as shown in FIG. 1, on and/or on a combination of user systems and processing systems. In the described examples, the implementing system includes one or more digital processors or processing circuitry ("processors"), and one or more storage devices (e.g., database 210, 220, or other storage devices). In some implementations, different components of one or more servers and/or clients can perform different blocks or other parts of the method 800. In some examples, a first device is described as performing blocks of method 800. Some implementations can have one or more blocks of method 800 performed by one or more other devices (e.g., other client devices or server devices) that can send results or data to the first device.

In some implementations, the method 800, or portions of the method, can be initiated automatically by a system. In some implementations, the implementing system is a first device. For example, the method (or portions thereof) can be periodically performed, or performed based on one or more particular events or conditions, e.g., reception of a fresh batch of monitoring metrics, based upon a user request, at a predetermined time, a predetermined time period having expired since the last performance of method 800, and/or one or more other conditions occurring which can be specified in settings read by the method.

Method 800 may begin at block 810, where a set of metrics to be monitored are obtained for a particular application. The set of metrics may be obtained based on stored configuration information that specifies corresponding metrics for each application.

In some implementations, the set of metrics includes application metric data that includes application level metrics, input metrics (metric data), and instance level metrics for each instance of a plurality of instances associated with a respective application of a plurality of applications operating over a distributed computing system.

Block 810 may be followed by block 820.

At block 820 a current topology information and instance level metrics for the application are obtained. In some implementations, a current topology is inferred by intelligently inferring regions, applications, load balancers, and instances from synced cloud accounts associated with a user. The topology information may include details of load balancers, and instances associated with the particular application.

In some implementations, credentials associated with a particular organization (client) may be utilized to obtain access to the current topology and metrics associated with one or more applications associated with the organization.

In some implementations, the current topology is directly obtained. In some other implementations, the current topology is determined via inference and/or updated from previously inferred topology. In some implementations, the current topology may include information about a number of regions, a number of load balancers, a number or virtual machines, a number of instances associated with each application, details of applications assigned to a particular instance, etc. In some implementations, a separate loop may be utilized to periodically update the topology, e.g., every 20 minutes, every 30 minutes, etc.

Block 820 may be followed by block 830.

At block 830, a first anomaly detection score is generated based on an analysis of instance level metrics. In some implementations, the analysis of instance level metrics may include a determination of one or more outlier instances of the set of instances associated with the application. In some implementations, a machine learning model may be utilized to determine the one or more outlier instances.

A clustering algorithm, e.g., similar to the clustering algorithm described with reference to FIG. 7A may be utilized to determine the one or more outlier instances. For example, one or more instances that are part of lonely clusters may be identified that are determined not to be part of migratory clusters. A distance measure of the metrics associated with such instances may be utilized to verify that the identified instance is indeed an outlier. An outlier anomaly detection score may be determined based on the distance measure of the instance, set of instances, or another feature of the cluster of the outlier instances, e.g., centroid location of such a lonely cluster.

Block 830 may be followed by block 840.

At block 840, a second anomaly detection score is determined based on application level input metrics. Determination of the second anomaly detection score may include obtaining a current value of one or more metrics, as well as estimated corresponding metric values for the one or more metrics that are estimated based on one or input metrics associated with the application. For example, input metrics such as traffic, number of requests, etc., may be provided to a trained machine learning model. The trained ML model may determine an estimated value for the one or more metrics based on previous application behavior and/or other user labelled data associated with the application. The second anomaly detection score may be determined based on a comparison of the estimated metric values for the one or more metrics with corresponding actual metric values for the one or more metrics.

In some implementations, the second anomaly detection score may be a measure of a deviation of a current value for a metric from an expected value for the metric based on previously observed trend(s) and one or more input metric(s) such as traffic, requests, etc., and may be indicative of application health and operational state.

Block 840 may be followed by block 850.

At block 850, a third anomaly detection score is determined based on seasonality of application level metrics. For example, the third anomaly detection score may be determined based on seasonal metric data, e.g., from historical values associated with one or more metrics that are being monitored. In some implementations, metric values are obtained for the one or more metrics from different time periods, e.g., last 2 days, last 3 days, last N weeks, same time/day of the week for the past N weeks, etc.

The seasonal metric data (historical metric values) are provided to a trained machine learning (ML) model. An estimated current value for each metrics is determined using the ML model. The ML model may utilize one or more techniques to estimate the value. For example, one or more of SMA, LTSM, ARIMA, and Kalman filtering techniques may be utilized to estimate a current value of a metric based on historical values of the metric. The ML model takes into account seasonal variations, recency trends, etc. to estimate the current value.

The third anomaly detection score may be determined based on a comparison of the seasonality based estimated metrics value with the corresponding actual metric value.

In some implementations, the third anomaly detection score may be a measure of a deviation of a current value for a metric from an expected value for the metric based on previously observed trend(s) and may be indicative of application health and operational state.

Block 850 may be followed by block 860 in some implementations. In other implementations, block 850 may be followed by block 870.

At block 860, a combined anomaly score may be generated based on combinations of the first, second, and third anomaly detection scores. Various combinations of the first, second, and third anomaly detection scores are envisaged. For example, an average of the first, second, and third anomaly detection scores may be determined as the combined anomaly score. In some implementations, the largest (greatest) of the first, second, and third anomaly detection scores may be determined as the combined anomaly score.

Block 860 may be followed by block 870.

At block 870, one or more alert and/or recommendation signals may be generated based on the generated anomaly score(s). Alerts may be communicated using one or more channels, e.g., paging systems, email systems, Slack channels, etc., and by utilizing one or more systems, e.g., 260 described with reference to FIG. 2.

In some implementations, a mapping of particular metrics to recommendations may be utilized to generate specific recommendations. The type of recommendation and a severity signal or severity score may be based on a type/category of metric that is detected as being associated with abnormal (anomalous) behavior. For example, a severity signal may indicate a high degree of severity if it is determined that a primary metric is indicative of abnormal (aberrant) application behavior. Similarly, a severity signal may indicate a lower degree of severity if it is determined that a secondary metric is indicative of abnormal application behavior.

In some implementations, the recommendation may be based on an average strength of a signal or alert indicative of anomalous behavior that is received for the application. In some other implementations, the recommendation may be based on a highest strength of a signal or alert indicative of anomalous behavior that is received for the application.

Block 870 may be followed by block 880.

At block 880, the generated signals and/or associated metadata is provided to a decision engine (core) for further analysis.

Block 880 may be followed by block 890.

At block 890, one or more recommendations are generated based on the received signals, and other metadata, severity, specific values, sensitivity, etc. A core decision engine may determine efficient and corrective workflows for all identified drifts in metrics and to infer optimal strategies for detection and safe remediations based on received alert signals.

In some implementations, the recommendations are based on previous signals received, and previous recommendations and actions that may have been undertaken.

In some implementations, recommendations may follow a specified hierarchical sequence of recommendations and are based on past system responses to implemented recommendations. For example, if a signal is received that a particular instance or application is associated with anomalous behavior, a restart may be recommended if it is the first signal (during a predetermined time window) received regarding the particular instance or application. However, if during a subsequent cycle of monitoring, a second signal is received regarding the particular instance or application and its anomalous behavior, a replacement of the instance/application may be recommended. If even the replacement does not work to resolve anomalous behavior, a recommendation with a higher severity score/level may be generated.

Recommendations may also be made for serverless applications that are monitored by the cloud management system. For serverless systems, a recommendation may be generated to increase an amount of allocated memory for the application based on received alert signals.

In some implementations, a feedback and reward engine, e.g., similar to feedback and reward engine 250 described with reference to FIG. 2 may be utilized to refine and filter recommendations.

In some implementations, recommendations may be categorized into different categories, and displayed via a user interface, along with the number of applications falling under each category. The categories may include Reboot, Restart, Deploy, Remediate inefficient Instance, Scale Up, Scale Down, Unused Instance, Under Efficient Concurrency, Remediate Application, Check Configuration, Optimize Memory, Inefficient Execution Cycle, Rollback Release, etc.

In some implementations, remediation actions may be performed autonomously based on the recommendations. Prior to performing the remediation action, a lock may be placed on the application or instance to ensure that other processes do not interfere with the actions. A current resource snapshot is obtained for the anomalous application. For example, a detailed current topology, number of instances, traffic and/or other input metrics, etc., may be obtained.

A post-remediation action resource level may be determined for the anomalous application based on performing the remediation action. For example, if instances (virtual machines) are to be deactivated, it may be determined how many virtual machines would remain, and whether the remaining resources would be sufficient to handle the expected traffic and/or load.

Resource thresholds may be utilized based on historical data or client provided parameters. For example, a client may specify a minimum number of virtual machines that are to be in active service. Remediation actions for the anomalous application are performed subsequent to a determination that the post-remediation action resource level for the anomalous application meets a predetermined resource threshold.

Method 800, or portions thereof, may be repeated any number of times using additional inputs. In some implementations, blocks 820-860 may be performed for an application across all metrics, or may be performed one metric at a time. In another example, block 810 may be performed for all applications, and blocks 820-860 performed on a per application basis.

FIGS. 9A-9D are screenshots that depict various features described in the disclosure.

Figure 9A:
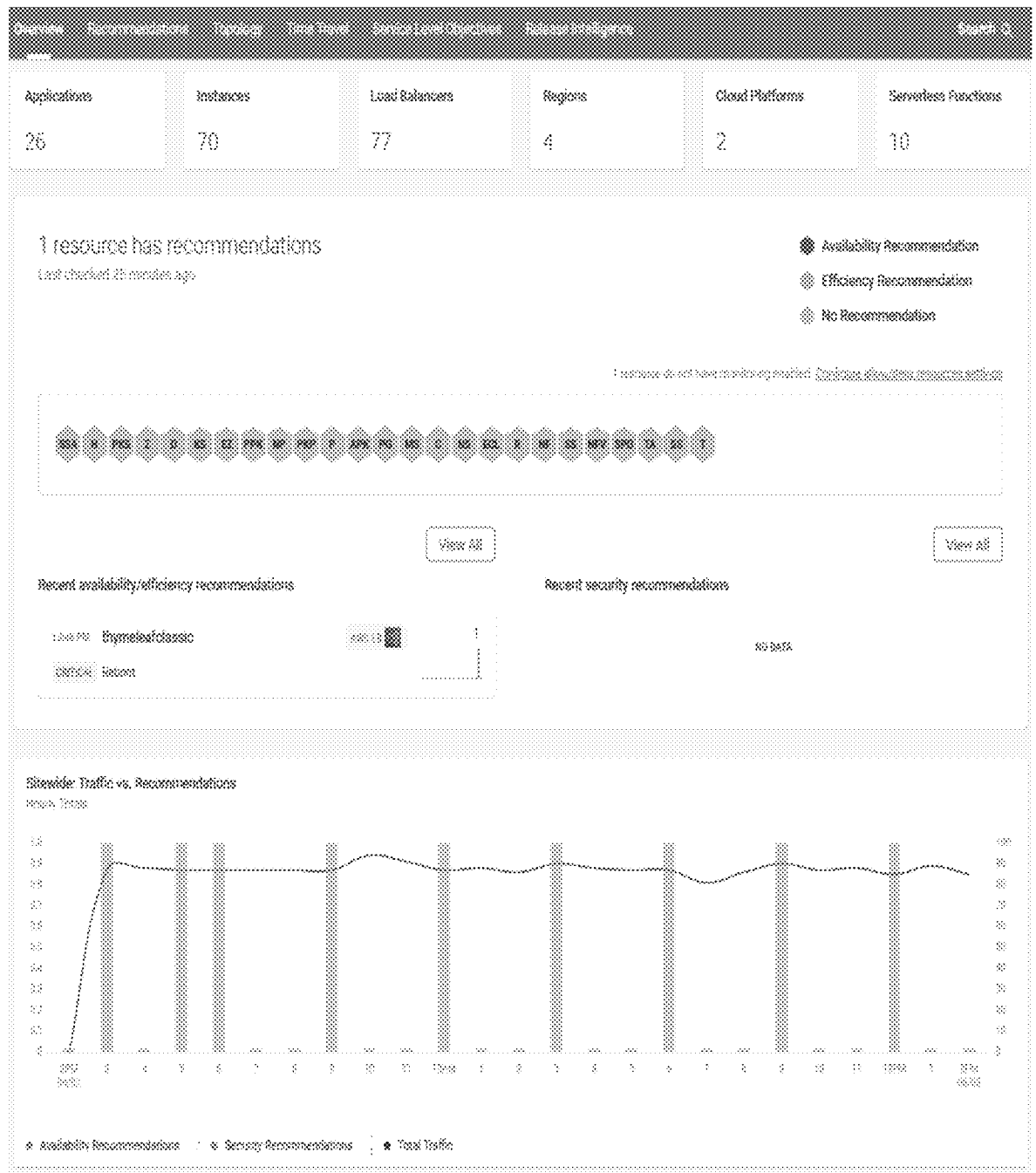
FIG. 9A-9D depict example screenshots of a cloud management system, in accordance with some implementations.

FIG. 9A is a screenshot of an example overview screen that may be displayed to a user via a user-interface. As depicted in FIG. 9A, the overview screen may include a display of the following:

- Applications—Displays the list of applications configured by the user.
- Instances—Displays the list of instances in the configured applications.
- Load Balancers—Displays the list of load balancers for the configured applications.
- Regions—Displays the geography of the cloud applications.
- Cloud Platform—Displays the cloud provider names for the applications configured by the user.
- Serverless Functions—Displays the list of Serverless functions running on the configured application.

Figure 9B:
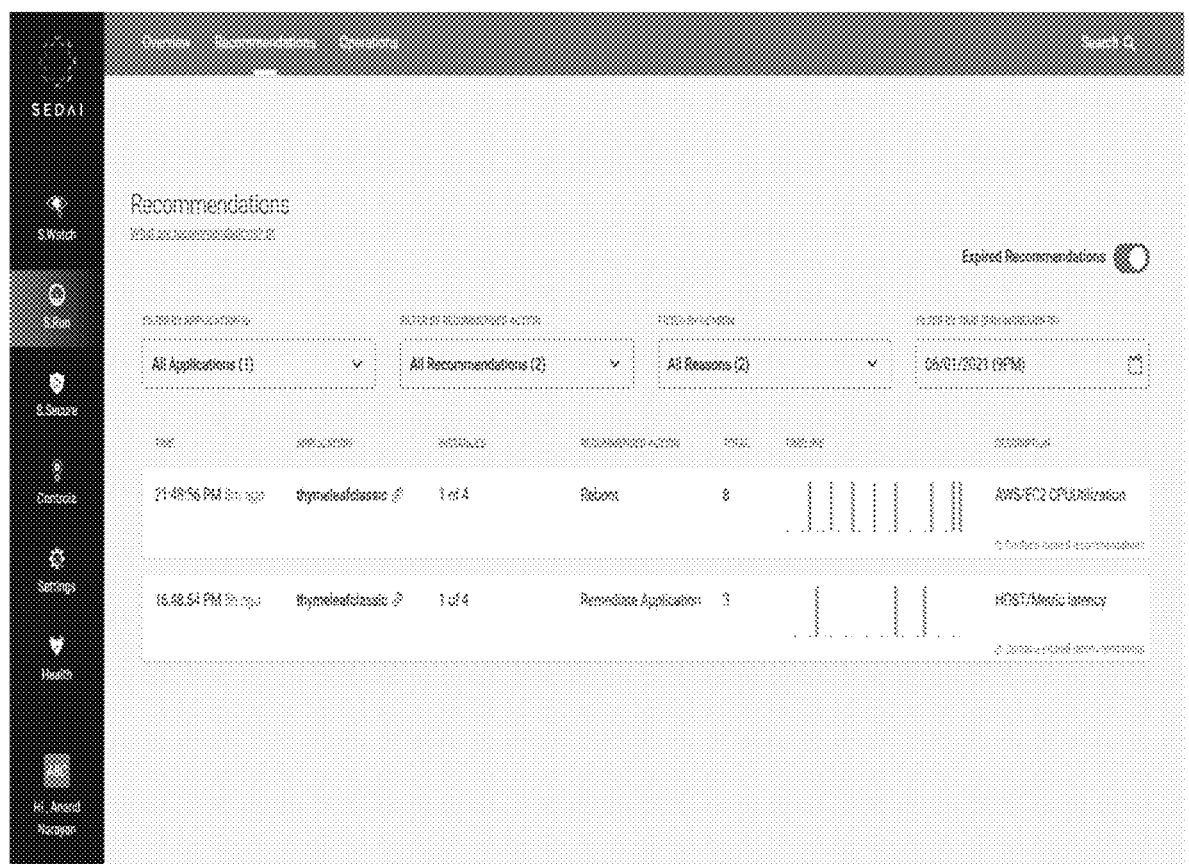

FIG. 9B is a screenshot of an example screen that displays recommendations for one or more applications. Both active and inactive recommendations may be displayed. Along with each recommendation, associated data such as a time of recommendation, an application for which the recommendation was generated, the recommendation, a timeline, and a description of the recommendation may be displayed.

Figure 9C:
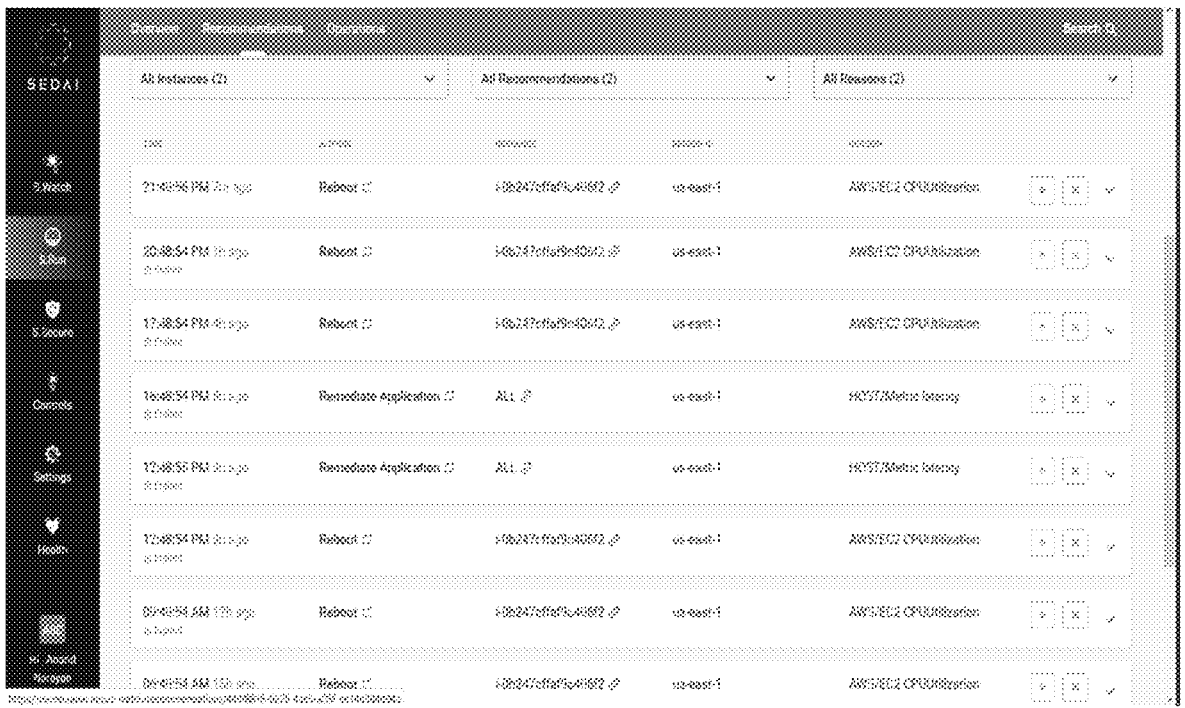

FIG. 9C is a screenshot of an example screen that displays recommendations for one or more instances as well as application-level recommendations. As can be seen, recommendations for instances include an identification of the specific instance, a region where the instance is located, and addition about the reasons, e.g., observed metric outliers that were observed.

Figure 9D:
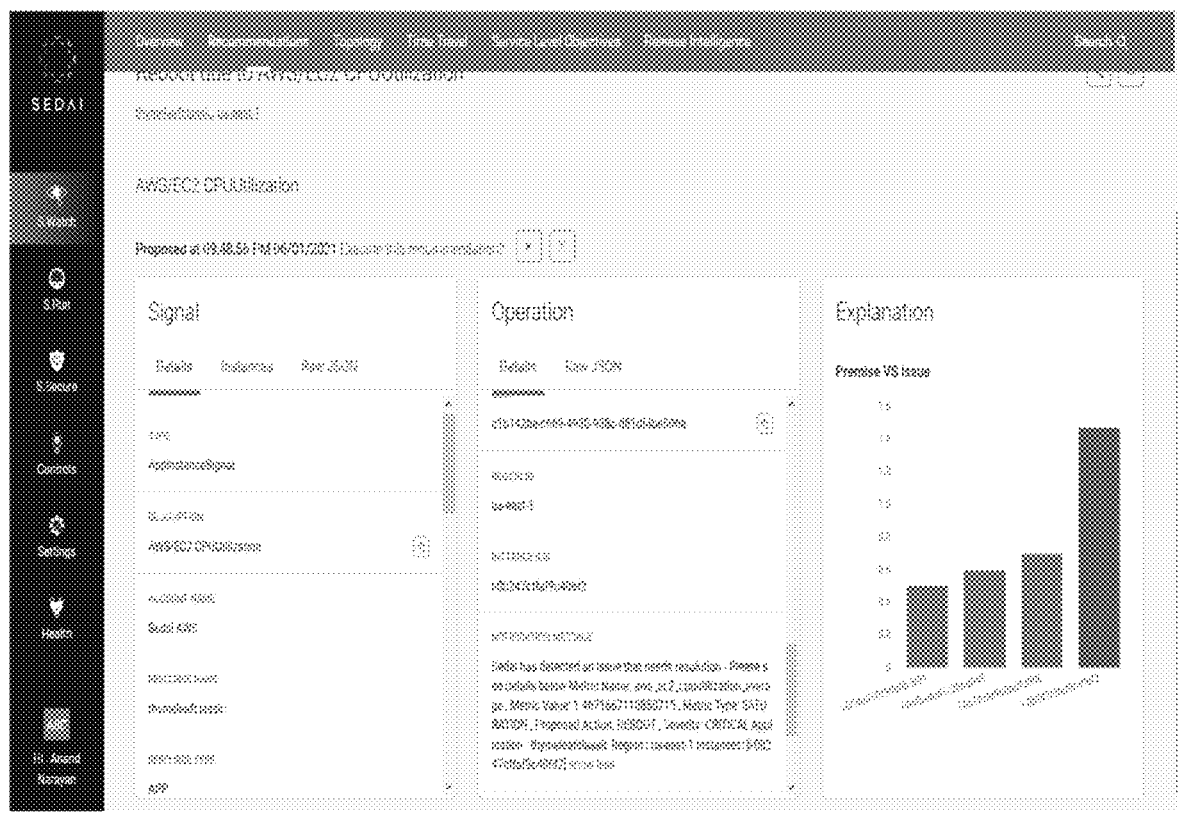

FIG. 9D is a screenshot of an example screen that displays detailed information about a particular recommendation. As can be seen, details of an observed metric for an instance that is detected as an outlier are displayed, along with metric values for peer instances. Along with the recommendation, an option may be provided to a user to execute the recommendation, in scenarios where auto remediation is not configured.

Figure 10:
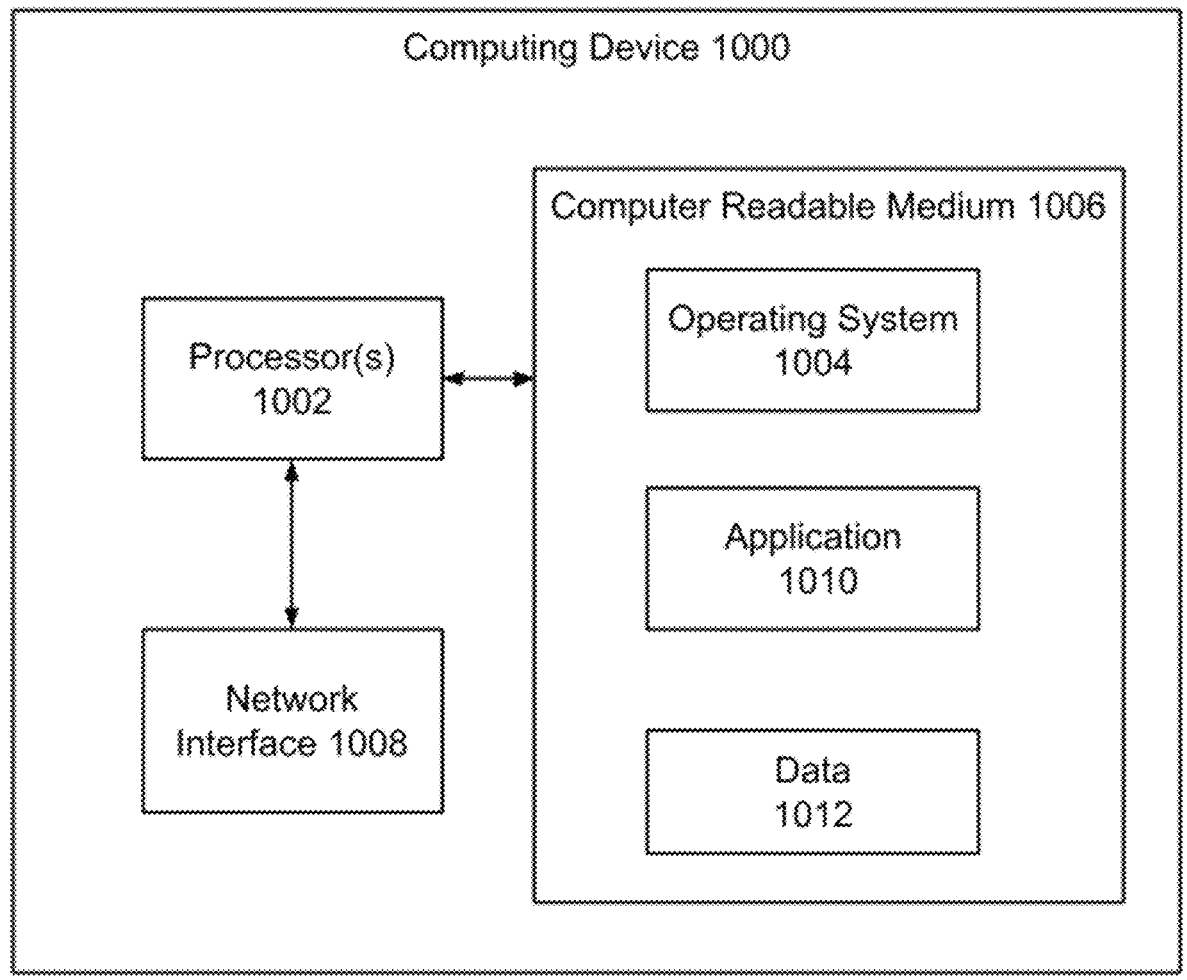
FIG. 10 is a block diagram illustrating an example computing device, in accordance with some implementations.

FIG. 10 is a block diagram of an example computing device 1000 which may be used to implement one or more features described herein. In one example, device 1000 may be used to implement a computer device (e.g., 130 and/or 120 of FIG. 1A), and perform appropriate method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1000 includes a processor 1002, a memory 1004, input/output (I/O) interface 1006, and audio/video input/output devices 1014.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1006 is typically provided in device 1000 for access by the processor 1002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1004, one or more applications 1010 and application data 1012. In some implementations, application 1010 can include instructions that enable processor 1002 to perform the functions (or control the functions of) described herein, e.g., some or all of the methods described with respect to FIGS. 5 and 8.

Elements of software in memory 1006 can alternatively be stored on any other suitable storage location or computer-readable medium. In addition, memory 1006 (and/or other connected storage device(s)) can store instructions and data used in the features described herein. Memory 1006 and any other type of storage (magnetic disk, optical disk, magnetic tape, or other tangible media) can be considered "storage" or "storage devices."

An I/O interface can provide functions to enable interfacing the server device 1000 with other systems and devices. For example, network communication devices, storage devices (e.g., memory and/or data store), and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 10 shows one block for each of processor 1002, memory 1006. These blocks may represent one or more processors or processing circuitries, operating systems, memories, I/O interfaces, applications, and/or software engines. In other implementations, device 1000 may not have all of the components shown and/or may have other elements including other types of elements instead of, or in addition to, those shown herein. While the processing system 130 is described as performing operations as described in some implementations herein, any suitable component or combination of components of processing system 130 or similar system, or any suitable processor or processors associated with such a system, may perform the operations described.

A user device can also implement and/or be used with features described herein. Example user devices can be computer devices including some similar components as the device 1000, e.g., processor(s) 1002, memory 1006, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500 and 800) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising: obtaining application metric data that includes application level metrics and instance level metrics for each instance of a plurality of instances associated with a respective application of a plurality of applications operating over a distributed computing system; generating a first anomaly detection score based on the instance level metrics; generating a second anomaly detection score based on one or more input metrics associated with the respective application; generating a third anomaly detection score based on seasonal metric data associated with the respective application; identifying at least one application of the plurality of applications as an anomalous application based on the first anomaly detection score, the second anomaly detection score, and the third anomaly detection score; and performing, by a program executing instructions, a remediation action for the at least one application, wherein the remediation action is one selected from: rebooting an instance of the at least one application, rebooting the at least one application, scaling up an instance of the at least one application, increasing a compute resource for an instance of the at least one application, decreasing a compute resource for an instance of the at least one application, scaling down an instance of the at least one application, deploying an additional instance of the at least one application, deactivating an instance of the at least one application, increasing a memory allocation for an instance of the at least one application, replacing an instance of the at least one application, and decreasing a memory allocation for an instance for the at least one application.

2. The computer-implemented method of claim 1, further comprising determining a severity score associated with the anomalous application.

3. The computer-implemented method of claim 1, wherein generating the first anomaly detection score comprises:
grouping the plurality of instances into a plurality of clusters;
determining one or more dominant clusters based on a number of instances included in the plurality of clusters; and
identifying one or more lonely clusters that lie outside a range bounded by the one or more dominant clusters.

4. The computer-implemented method of claim 3, further comprising determining a number of clusters in the plurality of clusters based on recursively calculating a respective silhouette score for each instance in the plurality of clusters.

5. The computer-implemented method of claim 3, further comprising determining a number of clusters in the plurality of clusters based on a determination of the number of clusters in the plurality of clusters that yields a maximum aggregate silhouette score for all instances in the plurality of clusters.

6. The computer-implemented method of claim 1, wherein generating the second anomaly detection score comprises:
  obtaining ground truth data for one or more application level metrics for the respective application;
  determining, using a trained machine learning model, a predicted value for the one or more application level metrics for the respective application based on the one or more input metrics; and
  calculating the second anomaly detection score based on a comparison of the predicted value for the one or more application level metrics with the ground truth data.

7. The computer-implemented method of claim 1, wherein generating the third anomaly detection score comprises:
  obtaining the seasonal metric data for the respective application;
  obtaining ground truth data for the respective application;
  determining, using a trained machine learning model, a predicted metric value for the respective application based on the seasonal metric data; and
  calculating the third anomaly detection score based on a comparison of the predicted metric value with the ground truth data.

8. The computer-implemented method of claim 1, wherein performing the remediation action comprises:
  obtaining a current resource snapshot for the anomalous application;
  determining a post-remediation action resource level for the anomalous application based on performing the remediation action; and
  performing the remediation action for the anomalous application based on a determination that the post-remediation action resource level for the anomalous application meets a predetermined resource threshold.

9. The computer-implemented method of claim 8, wherein the remediation action comprises deactivating one or more instances associated with the anomalous application.

10. A non-transitory computer-readable medium comprising instructions that, responsive to execution by a processing device, causes the processing device to perform operations comprising: obtaining application metric data that includes application level metrics and instance level metrics for each instance of a plurality of instances associated with a respective application of a plurality of applications operating over a distributed computing system; generating a first anomaly detection score based on the instance level metrics; generating a second anomaly detection score based on one or more input metrics associated with the respective application; generating a third anomaly detection score based on seasonal metric data associated with the respective application; generating a combined score based on the first anomaly detection score, the second anomaly detection score, and the third anomaly detection score; identifying at least one application of the plurality of applications as an anomalous application based on the combined score; and performing, by a program executing instructions, a remediation action for the at least one application, wherein the remediation action is one selected from: rebooting an instance of the at least one application, rebooting the at least one application, scaling up an instance of the at least one application, increasing a compute resource for an instance of the at least one application, decreasing a compute resource for an instance of the at least one application, scaling down an instance of the at least one application, deploying an additional instance of the at least one application, deactivating an instance of the at least one application, increasing a memory allocation for an instance of the at least one application, replacing an instance of the at least one application, and decreasing a memory allocation for an instance for the at least one application.

11. The non-transitory computer-readable medium of claim 10, wherein generating the first anomaly detection score comprises:
  grouping the plurality of instances into a plurality of clusters;
  determining one or more dominant clusters based on a number of instances included in the plurality of clusters; and
  identifying one or more lonely clusters that lie outside a range bounded by the one or more dominant clusters.

12. The non-transitory computer-readable medium of claim 10, wherein generating the second anomaly detection score comprises:
  obtaining ground truth data for one or more application level metrics for the respective application;
  determining, using a trained machine learning model, a predicted value for the one or more application level metrics for the respective application based on the one or more input metrics; and
  calculating the second anomaly detection score based on a comparison of the predicted value for the one or more application level metrics with the ground truth data.

13. The non-transitory computer-readable medium of claim 10, wherein the remediation action comprises deactivating one or more instances associated with the anomalous application.

14. A system comprising: a memory with instructions stored thereon; and a processing device, coupled to the memory, the processing device configured to access the memory and execute the instructions, wherein the instructions cause the processing device to perform operations including: obtaining application metric data that includes application level metrics and instance level metrics for each instance of a plurality of instances associated with a respective application of a plurality of applications operating over a distributed computing system; generating a first anomaly detection score based on the instance level metrics; generating a second anomaly detection score based on one or more input metrics associated with the respective application; generating a third anomaly detection score based on seasonal metric data associated with the respective application; generating a combined score based on the first anomaly detection score, the second anomaly detection score, and the third anomaly detection score; identifying at least one application of the plurality of applications as an anomalous application based on the combined score; and performing, by a program executing instructions, a remediation action for the at least one application, wherein the remediation action is one selected from: rebooting an instance of the at least one application, rebooting the at least one application, scaling up an instance of the at least one application, increasing a compute resource for an instance of the at least one application, decreasing a compute resource for an instance of the at least one application, scaling down an instance of the at least one application, deploying an additional instance of the at least one application, deactivating an instance of the at least one application, increasing a memory allocation for an instance of the at least one application, replacing an instance of the at least one application, and decreasing a memory allocation for an instance for the at least one application.

15. The system of claim 14, wherein generating the first anomaly detection score comprises:
- grouping the plurality of instances into a plurality of clusters;
- determining one or more dominant clusters based on a number of instances included in the plurality of clusters; and
- identifying one or more lonely clusters that lie outside a range bounded by the one or more dominant clusters.

16. The system of claim 14, wherein the operations further comprise determining a severity score associated with the anomalous application.

17. The system of claim 14, wherein performing the remediation action comprises:
- obtaining a current resource snapshot for the anomalous application;
- determining a post-remediation action resource level for the anomalous application based on performing the remediation action; and
- performing the remediation action for the anomalous application based on a determination that the post-remediation action resource level for the anomalous application meets a predetermined resource threshold.

* * * * *